(12) United States Patent
Legerton et al.

(10) Patent No.: US 12,531,155 B2
(45) Date of Patent: Jan. 20, 2026

(54) INTELLIGENT EXTENDED REALITY EYEWEAR

(71) Applicant: Innovega, Inc., Bellevue, WA (US)

(72) Inventors: Jerome A. Legerton, Jupiter, FL (US); Jay Marsh, Perris, CA (US)

(73) Assignee: Innovega, Inc., Bellevue, WA (US)

( * ) Notice: Subject to any disclaimer, the term of this patent is extended or adjusted under 35 U.S.C. 154(b) by 696 days.

(21) Appl. No.: 17/481,054

(22) Filed: Sep. 21, 2021

(65) Prior Publication Data

US 2023/0089522 A1    Mar. 23, 2023

(51) Int. Cl.

| | |
|---|---|
| *A61B 3/113* | (2006.01) |
| *A61B 3/02* | (2006.01) |
| *A61B 3/10* | (2006.01) |
| *A61B 3/12* | (2006.01) |
| *G02B 27/01* | (2006.01) |
| *G02B 27/02* | (2006.01) |
| *G06T 19/00* | (2011.01) |
| *G16H 40/63* | (2018.01) |
| *G16H 50/20* | (2018.01) |

(52) U.S. Cl.
CPC ......... *G16H 50/20* (2018.01); *G02B 27/0172* (2013.01); *G02B 27/02* (2013.01); *G06T 19/006* (2013.01); *G16H 40/63* (2018.01); *G02B 2027/014* (2013.01)

(58) Field of Classification Search
CPC ......... A61B 3/02; A61B 3/102; A61B 3/1025; A61B 3/1015; A61B 3/1225; A61B 3/024; A61B 3/005

USPC ....... 351/209, 200, 205, 206, 210, 221–223, 351/239, 245, 246

See application file for complete search history.

(56) References Cited

U.S. PATENT DOCUMENTS

| | | | |
|---|---|---|---|
| 9,360,672 B2 * | 6/2016 | Kobayashi | G02B 27/017 |
| 10,319,154 B1 | 6/2019 | Chakravarthula et al. | |
| 10,463,248 B2 * | 11/2019 | Cornsweet | A61B 3/0091 |
| 10,690,945 B2 * | 6/2020 | Fayolle | A61B 3/0041 |
| 11,803,065 B1 * | 10/2023 | Abou Shousha | G02B 27/0176 |
| 2010/0296055 A1 * | 11/2010 | Esser | G02C 7/027 351/204 |
| 2015/0185503 A1 | 7/2015 | Tate et al. | |
| 2015/0213634 A1 | 7/2015 | Karmarkar et al. | |

(Continued)

OTHER PUBLICATIONS

PCT International Search Report and the Written Opinion mailed Jan. 24, 2023, issued in related International Application No. PCT/US2022/044132 (7 pages).

*Primary Examiner* — Dawayne Pinkney

(74) *Attorney, Agent, or Firm* — Sheppard Mullin Richter & Hampton LLP

(57) ABSTRACT

In general, one aspect disclosed features a computer-implemented method comprising: obtaining a first metric of a physiological aspect of a patient, the first metric obtained at a first time by a head-wearable apparatus while the head-wearable apparatus is worn by the patient; obtaining a second metric of the physiological aspect of a patient, the second metric obtained at a second time by the head-wearable apparatus while the head-wearable apparatus is worn by the patient, wherein the second time is later than the first time; determining a value for a parameter of the head-wearable apparatus based on the first metric and the second metric; and setting the parameter in the head-wearable apparatus to the determined value for the parameter.

21 Claims, 14 Drawing Sheets

(56) References Cited

U.S. PATENT DOCUMENTS

| | | | | |
|---|---|---|---|---|
| 2016/0131908 A1* | 5/2016 | Fateh | ............... | G06F 3/03547 |
| | | | | 345/633 |
| 2017/0363873 A1* | 12/2017 | Chen | ............... | G02B 27/0172 |
| 2020/0093362 A1* | 3/2020 | Jackson | ............... | A61B 3/022 |
| 2021/0076930 A1* | 3/2021 | Blaha | ............... | A61B 3/005 |
| 2021/0275013 A1* | 9/2021 | Alvarez | ............... | G02B 27/017 |
| 2021/0315453 A1* | 10/2021 | Jeon | ............... | A61B 5/162 |

\* cited by examiner

| | |
|---|---|
| 1 | 20/200 |
| 2 | 20/100 |
| 3 | 20/70 |
| 4 | 20/50 |
| 5 | 20/40 |
| 6 | 20/30 |
| 7 | 20/25 |
| 8 | 20/20 |
| 9 | |
| 10 | |
| 11 | |

NCKOZ
RHSDK
DOVHR
HSRCZ
NOCRH
DKSNV
ZSOKN
KODNR
HSRDZ
NVHKD
KRNCS
CDKVN
NVHOD
DHVNK
NXXSS

FIG. 3B

MAGNIFICATION

INTELLIGENT EXTENDED REALITY EYEWEAR

CROSS REFERENCE TO RELATED APPLICATIONS

The present application is related to U.S. patent application Ser. No. 16/915,985, filed Jun. 29, 2020, entitled "Display Eyewear With Adjustable Camera Direction," U.S. patent application Ser. No. 16/915,951, filed Jun. 29, 2020, entitled "Display Eyewear With Auditory Enhancement," and U.S. patent application Ser. No. 15/588,028, filed May 5, 2017, entitled "Gaze Tracking System With Contact Lens Fiducial," the disclosures thereof incorporated by reference herein in their entirety.

DESCRIPTION OF RELATED ART

The disclosed technology relates generally to extended reality eyewear, and more particularly some embodiments relate to content presented by the displays of the eyewear and methods for capturing user responses and eyewear settings and integrating the user responses to change eyewear settings and to communicate user response and eyewear setting history to health care practitioners.

SUMMARY

Extended reality eyewear are available for virtual reality, augmented reality and mixed reality. The eyewear may be in the form of attachments to ordinary spectacle frames, modified hard hats or helmets, headsets, visors, smart contact lens or spectacle frame form factor. The display technology may include waveguide, off axis projection, stacked waveguides, occluded micro-displays or other means of presenting digital content in the smart contact lens or eyewear. The eyewear may be direct view and may not require optics to focus the display or may have geometric optics between the display and the eye or may be used in conjunction with a contact lens that focuses the near eye display for the user's eye. The extended reality eyewear may include one or more cameras or sensors. The sensors may include eye tracking, head tracking, accelerometers, SLaM, microphones, or the like. The extended reality eyewear may include speakers on or apart from the eyewear and in the form of ear buds, headphones, bone conduction, hearing devices for the auditory impaired, or the like. Processors, controllers, and power sources may be located on or in the extended reality eyewear or may be in devices separate from the eyewear. The extended reality eyewear may have a user interface or controller that allows the user to modulate the input and or/output performance of the extended reality eyewear. The extended reality eyewear may be connected by any means to a telecommunications system or means of transferring information to and/or from the eyewear.

The operating system of the extended reality eyewear may allow for settings to be constructed at the time of manufacturing or after distribution of the product. The user may be allowed to adjust the individual settings or a group of settings. A group of settings may be called a preset or a named performance profile. Some embodiments provide an artificial intelligence system that may adjust at least one setting or a preset by way of a Neural-loop Computational Model where at least one of a trend history of self-modulated settings or sensory, cognitive, or psychological measures provide the input for one or more algorithms for determining a setting or preset. The connectivity of the extended reality eyewear to a telecommunication system or other means for transferring to and or from the extended reality eyewear may be used to provide the trend history or sensory cognitive or psychological measures to health care professionals or the like.

Some embodiments provide apparatus, systems, and methods for measuring key visual, auditory, cognitive and psychological metrics with or without captured history of the time and frequency of use of a continuum of levels of at least one setting of a unit of extended reality eyewear, inputting at least one metric at two or more times or inputting at least one trend history into a computer program product, and applying an algorithm for determination of at least one setting of the extended reality eyewear display, auditory or content output, and changing at least one setting of the extended reality eyewear.

Embodiments of the disclosed technology provide for a novel means of optimizing the performance of extended reality eyewear that eliminates the need for the user to tediously manage the settings or presets. Some embodiments provide a system of data collection and example algorithm for using the data to select at least one setting or preset.

In general, one aspect disclosed features extended reality eyewear enabled by a contact lens having a central micro-lens and an inner filter and outer filter for creating a display light path and a non-display light path respectively; and having a fiducial that operates in conjunction with a gaze tracker, for example as taught by U.S. patent application Ser. No. 15/588,028. The extended reality eyewear may include a transparent display technology or an occluded display technology. In one embodiment the extended reality eyewear includes one camera fixed in the eyewear. The eyewear may include a processor and wireless connectivity to an intermediate controller or mobile telephone.

In some embodiments the extended reality software system includes application software. The software may include a means of controlling the optical or digital zoom of the camera or software and the luminance of at least one display. In some embodiments the luminance of the right and left display may be different for optimum visual performance. The software may include the ability to reverse black on white to white on black or change the color scheme of an image. The software may include image enhancement to change image contrast or clarity. The software may include the ability to add vignetting or reverse vignetting. The software may include the control of asymmetrical zoom wherein the outer portion of an image is increased in size to be greater than the inner portion of an image. The software may include the control of the vertical and/or horizontal position of images on the display wherein the center of an image produced by the fixed camera or other image source is shifted from the center of the display.

The application software may include test targets and methods for measuring visual performance. The visual performance measures may include at least one of visual acuity, contrast sensitivity, reading speed, dark adaptation, color vision, preferred retinal locus, phorias, lateral and vertical fusional reserves, cyclotorsion, aniseikonia, stereopsis, central retinal visual defect detection, pupil size and reactivity, visual fields and responses to vision, dry eye, ocular comfort, general health, daily living skill, and quality of life questionnaires.

The application software may include auditory testing including thresholds for hearing one or more sound frequencies or testing speech recognition. The application software may include one or more cognitive tests or one or more psychometric tests.

The problem solved by the present invention is the elimination of the need of the user to manually change presets when changes in sensory, cognitive, or psychological metrics are determined; and/or to change presets for therapeutic intervention for neuro-rehabilitative, cognitive, psychological, or visual therapies; and/or to provide the trend history and measured data to respective health care professionals.

The present invention teaches the collection of relevant use history of at least one setting for extended reality eyewear and the use of the history to adjust at least one setting of the eyewear by an algorithm predetermined for the setting. The present invention teaches the collection of at least one metric presented to the user by the extended reality eyewear wherein an objective measure or subjective response is received by the extended reality eyewear and stored for communication to a health care professional or used by a software application to change at least one setting of the extended reality eyewear.

In general, one aspect disclosed features extended reality eyewear developed for use by the visually impaired. The application software may include a means of controlling the zoom setting of the camera and separately the luminance setting of at least one display. The software may include a means of controlling a reverse of black on white text to white on black or change the color scheme of an image. The software may include image enhancement to change image contrast or clarity. The software may include the ability to add vignetting or reverse vignetting. The software may include the control of asymmetrical zoom wherein the outer portion of an image is increased in size to be greater than the inner portion of an image. The software may include the control of the vertical and/or horizontal position of images on the display wherein the center of an image produced by the fixed camera is shifted from the center of the display for different head tilt and vertical gaze positions of an eye.

Embodiments of the method may include one or more of the following features. Some embodiments comprise collecting the use time data that the extended reality eyewear is used. The use time data may be collected for individual settings. The use time data may be collected for a group of settings or a preset. The frequency or use time of a user's modulation of a single setting within a group of settings may be collected. These data may be used to adjust a preset or a single setting within a preset.

Embodiments of the method may include one or more of the following features: Some embodiments comprise using at least one of the measures of visual acuity, contrast sensitivity, reading speed, dark adaptation, color vision, preferred retinal locus, phorias, lateral or vertical fusional reserves, stereopsis, visual fields, central retinal visual defect detection, pupil size and reactivity, and responses to vision, dry eye, ocular comfort, general health, daily living skill, and quality of life questionnaires to adjust a preset or a single setting within a preset. Some embodiments comprise using at least one of the measures of auditory testing to adjust a preset for an associated hearing device or a single setting with a preset of an associated hearing device. Some embodiments comprise using at least one cognitive or psychological measure to adjust at least one preset or a single setting within a preset for the extended reality eyewear and associated hearing device.

In general, one aspect disclosed features a computer-implemented method comprising: obtaining a first metric of a physiological aspect of a patient, the first metric obtained at a first time by a head-wearable apparatus while the head-wearable apparatus is worn by the patient; obtaining a second metric of the physiological aspect of a patient, the second metric obtained at a second time by the head-wearable apparatus while the head-wearable apparatus is worn by the patient, wherein the second time is later than the first time; determining a value for a parameter of the head-wearable apparatus based on the first metric and the second metric; and setting the parameter in the head-wearable apparatus to the determined value for the parameter.

Embodiments of the method may include one or more of the following features. Some embodiments comprise presenting a stimulus to the patient via the head-wearable apparatus at the first time; and presenting the stimulus to the patient via the head-wearable apparatus at the second time. In some embodiments, determining the value for the parameter of the head-wearable apparatus based on the first metric and the second metric comprises: providing the first metric and the second metric as input to a machine learning model, the machine learning model being trained according to historical metrics and corresponding values for the parameter, wherein responsive to the input, the machine learning model provides as output the value for the parameter of the head-wearable apparatus. Some embodiments comprise determining a time value based on the first time and the second time; and determining the value for the parameter of the head-wearable apparatus based on the first metric, the second metric, and the determined time value. In some embodiments, the physiological aspect of a patient comprises one or more of: an aspect related to the vision of the patient, or an aspect related to the hearing of the patient. Some embodiments comprise determining a change in a condition of the patient based on the first metric and the second metric; and determining the value for the parameter of the head-wearable apparatus based on the determined change in the condition of the patient. In some embodiments, the condition of the patient comprises one or more of: a visual condition of the patient; a auditory condition of the patient; a cognitive condition of the patient; or a psychological condition of the patient.

In general, one aspect disclosed features a system, comprising: one or more hardware processors; and a non-transitory machine-readable storage medium encoded with instructions executable by the one or more hardware processors to perform operations comprising: obtaining a first metric of a physiological aspect of a patient, the first metric obtained at a first time by a head-wearable apparatus while the head-wearable apparatus is worn by the patient; obtaining a second metric of the physiological aspect of a patient, the second metric obtained at a second time by the head-wearable apparatus while the head-wearable apparatus is worn by the patient, wherein the second time is later than the first time; determining a value for a parameter of the head-wearable apparatus based on the first metric and the second metric; and setting the parameter in the head-wearable apparatus to the determined value for the parameter.

Embodiments of the system may include one or more of the following features. In some embodiments, the operations further comprise: presenting a stimulus to the patient via the head-wearable apparatus at the first time; and presenting the stimulus to the patient via the head-wearable apparatus at the second time. In some embodiments, determining the value for the parameter of the head-wearable apparatus based on the first metric and the second metric comprises: providing the first metric and the second metric as input to a machine learning model, the machine learning model being trained according to historical metrics and corresponding values for the parameter, wherein responsive to the input, the machine learning model provides as output the value for the parameter of the head-wearable apparatus. In some embodiments, the operations further comprise: determining a time value based on the first time and the second time; and determining the value for the parameter of the head-wearable apparatus based on the first metric, the second metric, and the determined time value. In some embodiments, the physiological aspect of a patient comprises one or more of: an aspect related to the vision of the patient, or an aspect related to the hearing of the patient. In some embodiments, the operations further comprise: determining a change in a condition of the patient based on the first metric and the second metric; and determining the value for the parameter of the head-wearable apparatus based on the determined change in the condition of the patient. In some embodiments, the condition of the patient comprises one or more of: a visual condition of the patient; a auditory condition of the patient; a cognitive condition of the patient; or a psychological condition of the patient.

In general, one aspect disclosed features a non-transitory machine-readable storage medium encoded with instructions executable by a hardware processor of a computing component, the machine-readable storage medium comprising instructions to cause the hardware processor to perform operations comprising: obtaining a first metric of a physiological aspect of a patient, the first metric obtained at a first time by a head-wearable apparatus while the head-wearable apparatus is worn by the patient; obtaining a second metric of the physiological aspect of a patient, the second metric obtained at a second time by the head-wearable apparatus while the head-wearable apparatus is worn by the patient, wherein the second time is later than the first time; determining a value for a parameter of the head-wearable apparatus based on the first metric and the second metric; and setting the parameter in the head-wearable apparatus to the determined value for the parameter.

Embodiments of the non-transitory machine-readable storage medium may include one or more of the following features. In some embodiments, the operations further comprise: presenting a stimulus to the patient via the head-wearable apparatus at the first time; and presenting the stimulus to the patient via the head-wearable apparatus at the second time. In some embodiments, determining the value for the parameter of the head-wearable apparatus based on the first metric and the second metric comprises: providing the first metric and the second metric as input to a machine learning model, the machine learning model being trained according to historical metrics and corresponding values for the parameter, wherein responsive to the input, the machine learning model provides as output the value for the parameter of the head-wearable apparatus. In some embodiments, the operations further comprise: determining a time value based on the first time and the second time; and determining the value for the parameter of the head-wearable apparatus based on the first metric, the second metric, and the determined time value. In some embodiments, the physiological aspect of a patient comprises one or more of: an aspect related to the vision of the patient, or an aspect related to the hearing of the patient. In some embodiments, the operations further comprise: determining a change in a condition of the patient based on the first metric and the second metric; and determining the value for the parameter of the head-wearable apparatus based on the determined change in the condition of the patient. In some embodiments, the condition of the patient comprises one or more of: a visual condition of the patient; a auditory condition of the patient; a cognitive condition of the patient; or a psychological condition of the patient.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3B illustrates a visual acuity chart using optotypes in a log MAR format.

Figure 1:
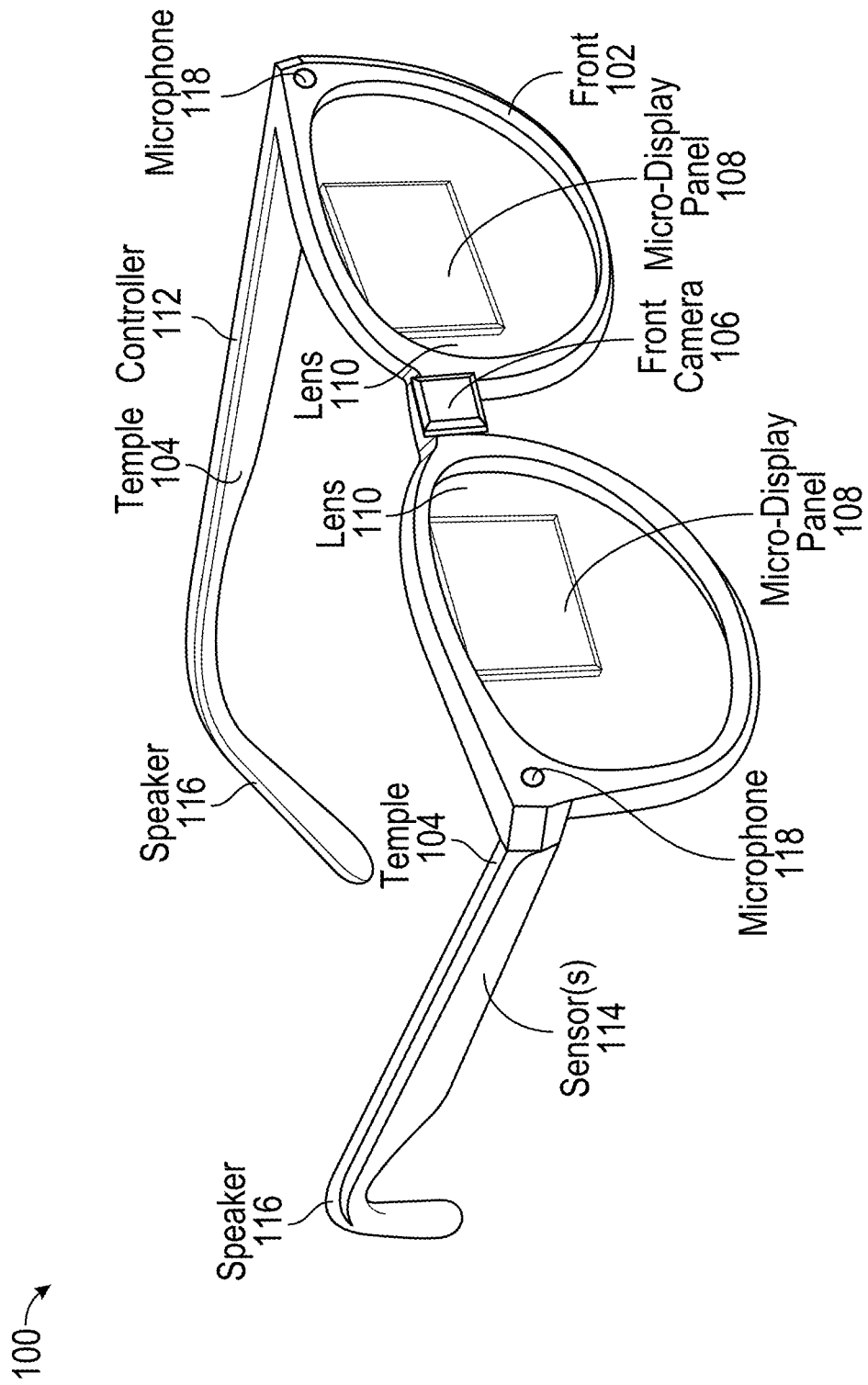
FIGS. 1 and 2 illustrate display eyewear according to some embodiments of the disclosed technology.

The figures are not exhaustive and do not limit the present disclosure to the precise form disclosed.

DETAILED DESCRIPTION

The specification and description include descriptive words according to the following definitions:

Application: Software and algorithms that derive a user specific delivery of audio and/or video output for the purpose of a treatment plan or therapy by way of a combination of digital inputs and outputs Setting: the manner, position, or value in which a function of the eyewear is set.

Parameters: Settings of the software that may be adjusted during use of the device Constants: Settings of the software that cannot be adjusted during use of the device Preset: a pre-determined individual setting within a profile or mode Profile/Mode: a group of presets Machine learning: the use and development of computer systems that are able to learn and adapt without following explicit instructions, by using algorithms and statistical models to analyze and draw inferences from patterns in data:

Artificial Intelligence: computer systems able to perform tasks that normally require human intelligence, Parameter States: Default values, initial values, and machine learned values.

Default Value: Defined in software as a value within the range of acceptable values. The default value may be determined from known mean values related to physiological or sensory measurements or requirements.

Initial Value: Defined by the health care professional based on clinical observations and data of the subject and the treatment plan or therapy Machine Learned Value: The numerical setting(s) developed during use of the device that is based on user adjustments, environmental monitoring, content signature according to algorithms built into the software or Artificial Intelligence or Machine Learning within the device.

Image signature/characteristic/convolution: Interpreting or characterizing the type of content based on a mathematical convolution of the frames of the video stream.

Virtual reality, augmented reality, and mixed reality systems, collectively referred to as extended reality systems, have been produced and commercialized for more than two decades. Early systems were in the form of bulky and heavy heads-up displays for aviators while more recent commercialized systems are in the form of headsets for gaming, monocular boom-arm devices primarily used to enhance occupational performance, and monocular and binocular spectacle frame like eyewear for anytime and anywhere information and entertainment as well as enhancing quality of life and independence for the visually impaired.

Extended reality systems share the common elements of an apparatus for displaying information, electronic means of transferring information to the displays, and power sources to operate the systems. Some systems include one or more cameras, sensors, processors, and controllers. The systems may have wireless capability or may be tethered to other devices including computers, mobile phones, or intermediate electronic devices that may include power sources and processing and control capabilities.

Some extended reality systems are operated in conjunction with application software that is designed to address user needs for general use and frequently refined for specific uses. For example, interactive games represent an application software that presents the video content to the extended reality display or displays. The application software allows the user to modulate the content or respond to the content in a manner that advances the game respective to the response or scores the user based on the response.

Applications for occupational performance enhancement may include providing instructions and using camera captured performance to direct the user or assess the accuracy of their performance or the volume of their task completion, and may feed information into an enterprise system for inventory tracking or production planning or the like.

Some extended reality systems are commercialized for the sensory and cognitively impaired. Systems for visual impairment are in use. The extended reality systems for the visually impaired have at least one camera to capture images of content of regard. The images are modulated to allow the visually impaired user the ability to perceive the content of regard at a greater distance than they would be able to perceive the content of regard without the extended reality system. The image modulation most often includes electronic zoom function to increase or decrease the image size, electronic luminance function to increase or decrease the display luminance, and color rendering to reverse black on white to white on black or to change to other color schemes. Some extended reality systems for the visually impaired increase or decrease image size in only one region in conjunction with gaze tracking or eye tracking. Some systems employ sensors to regulate the display luminance as a function of sensed ambient light levels.

Some commercialized extended reality systems for the visually impaired having single fixed cameras use hinges to allow the front of the eyewear or headset to change in angle when the user is viewing a distant content of regard, an intermediate lower content of regard like a puzzle on a table, or a near content of regard like text held in the hands. Other extended reality systems employ two or more cameras to achieve different camera viewing angles to address the requirements for a plurality of viewing angles.

U.S. patent application Ser. No. 16/915,985 entitled "Display Eyewear with Adjustable Camera Direction", teaches changing the angle of a camera or shifting the display content to allow captured pixels within the viewing angle of a fixed camera position to be aligned with a straight-ahead line of sight and a natural head tilt position for a task like reading where the natural head tilt position differs from the natural head tilt position when viewing objects at eye level across a room.

Extended reality eyewear may include microphones for capturing the speech of the user to control the eyewear or the speech of others or other sounds. U.S. patent application Ser. No. 16/915,951 entitled "Display Eyewear with Auditory Enhancement", teaches an array of directional microphones coupled with gaze tracking to select the speech of an individual speaker for the purpose of displaying the speech as text on at least one display in an extended reality eyewear or to be used in conjunction with a hearing device to create greater ease in hearing a speaker in a noisy environment. In some embodiments the speech is presented as one word at a time to allow the user to maintain simultaneous fixation on the speaker while reading the speech recognized text presented in the eyewear display. The user may control the size, luminance, and location of the presented text and the like.

The user interface or controller for extended reality eyewear systems may allow the user to modulate one or more of the image modulation functions. There is value in recording the frequency or time the user may select each image modulation function and the combination of image modulation functions. An analysis of the user preferences or selections of one or more self-selected settings is useful for creating new presets or combinations of settings.

There is a need for extended reality eyewear in combination with an application for assessing visual performance. This present invention teaches the recording of the frequency of use of preset settings as well as self-modulated settings for the assessment of visual performance by way of trend analysis. The trend analysis may be used with or without the visual performance assessment including at least one of visual acuity, contrast sensitivity, reading speed, dark adaptation, color vision, preferred retinal locus, phorias, lateral and vertical fusional reserves, cyclotorsion, aniseikonia, stereopsis, visual fields, central retinal visual defect detection, pupil size and reactivity, and similar trends.

Extended reality eyewear for the visually impaired presents an opportunity to capture information that may alert the eyecare practitioner and user to changes in visual performance or progression of visual loss and its impact on daily living skills, independent living, vocational performance and quality of life. The recording of the settings used and these visual performance data over time provides potential for historical health care data presentation for the eye care professional. These data are also useful for the machine learning system of the present invention that may be used to regulate the settings of the extended reality eyewear for optimum performance for the user.

A product opportunity exists for an extended reality system comprised of electronic display technology, at least one forward facing camera and/or means of digital image transfer, and application software for presenting images on the display, and a storage medium for captured information of the settings used by the user and captured visual performance data.

In some embodiments the extended reality eyewear may include at least one of a gaze tracker, inward facing camera, outward facing camera, ambient light sensor, head tracker, accelerometer, sensors and processors for simultaneous location and mapping (SLaM), a microphone, or a speaker.

While extended reality eyewear systems are available, and while some systems are used by those with sensory and cognitive impairment or traumatic brain injury, there is a need for extended reality eyewear and an operating system with application software that captures the use of preset settings or self-modulated settings for the purpose of regulating presets including the creation of new presets with two or more categories of image modulation. In some embodiments the regulation of presets may be achieved by a Neural-loop Computational Model by use of captured visual, auditory, cognitive performance, or psychometric data with or without information gathered by other sensors. A sequence of one or more changes in presets may be used for therapeutic intervention for binocular vision performance, vision-perception disorders, learning disabilities, cognitive decline and disorders, psychological disorders and neuro-rehabilitation for traumatic brain injury.

Some embodiments of the disclosed technology provide for extended reality eyewear, an operating system, application software including a Neural-loop Computational Model and a means of transferring information to and/or from the eyewear. In some embodiments the extended reality eyewear has at least one information display and may be connected to at least one processor, one controller and one power source. In some embodiments the extended reality eyewear has at least one of a camera, a gaze tracker, a sensor, a microphone, and a speaker.

In some embodiments, the extended reality eyewear may include the following features: a video source from a camera or an externally or internally generated video file, and may be a motion and/or still imager, a display system with at least one display that may be transparent or occluded, software to manipulate the video source for display on the display system, at least one sensor for enhancing the video source manipulation including an accelerometer, light sensor, camera, SLaM or GPS, and an operating system to coordinate the system and sensor(s). Video manipulations may include manual or automatic control of luminance, contrast, saturation, hue, edge enhancement, uniform and non-uniform scale, stabilization, cropping, vertical and horizontal image shifting, image rotation, or frame rate.

In some embodiments the extended reality eyewear and application software may include the following features: settings to deliver at least one of a predetermined image size, luminance, vertical position, horizontal position, angular orientation, non-uniform zoom, vignetting and reverse vignetting, conversion of text to single word presentation, the speed of the serial text visual presentation, character width of serial visual presentation, image color, audio volume, volume of individual audio frequencies, or enhanced audio output for improved speech recognition or noise reduction, cognitive stimuli, and emotional messaging and affirmations.

In some embodiments the extended reality eyewear and application software may detect and save at least one of the use time data for individual settings, the use time data for a group of settings or a preset, or the frequency or use time of a user's modulation of a single setting within a group of settings.

In some embodiments the extended reality eyewear and application software may measure at least one of: visual acuity, contrast sensitivity, reading speed, dark adaptation, color vision, preferred retinal locus, phorias, lateral and vertical fusional reserves, cyclotorsion, aniseikonia, stereopsis, visual fields, central retinal defect detection, pupil size and reactivity, blink rate, blink quality, tear break up time, tear meniscus height, bulbar conjunctival hyperemia, meibomian gland occlusion, keratinized lid margins, auditory frequency thresholds, speech detection, short and or long term memory, deductive reasoning, daily living skill capability, depression, anxiety or other psychological state endpoints, and responses to vision, dry eye, ocular comfort, general health, daily living skill, quality of life, cognitive, and psychometric questionnaires that may be captured by responses to audio or visual output from the eyewear and the like.

In some embodiments a first measure of at least one of the above is detected and saved and a second measure of the same at a subsequent time is detected and saved. The two measures are compared to detect a change in the measure. In one embodiment the wearable display system designed for a visually impaired user who may experience progressive visual impairment incorporates at least one camera, image processing software, and at least one means of displaying camera generated content and/or other digital content to the user.

The software includes a means of measuring visual acuity like a log MAR optotype presentation that requires a subjective response from the user. The Neural-loop Computational Model begins with an initial measure of the minimum angle of resolution of an eye. The log MAR measured for this example is 1.00 log MAR (20/200) which is the legal blindness level. The visual objective of the user is determined and entered into the model. For example, the user may select the objective of reading newsprint at a normal distance of 16 inches (40 cm). Newsprint is understood to subtend an angle requiring 0.3 log MAR (20/40) at 16 inches. Those skilled in the art of vision rehabilitation understand a visual acuity reserve is needed wherein a visually impaired person must achieve 0.2 log MAR (two Snellen lines) smaller than their visual objective to have good facility accomplishing the respective visual objective. Hence the required log MAR=0.3−0.2=0.1, (20/25).

The model must incorporate the optical magnification of the camera system before any digital magnification. In this example the optical magnification of the camera system is zero. The model then calculates the digital magnification required after the optical magnification. The adjusted visual objective of 20/25 (0.1 log MAR) determined above must be magnified to subtend an angle of 20/200 (1.0 log MAR), or 200/25=8×. In the same manner, the log MAR values may be calculated with the adjusted visual objective of 0.1 log MAR (20/25) determined above must be magnified to subtend an angle of 1.0 log MAR (20/200), or log MAR 1.0–log MAR 0.1=log MAR 0.9, and thus 10^0.9=8, or 8×. This magnification is entered into the preset or profile for the user for the task of reading newsprint at 16".

The second layer of data managed by the model may be the manual adjustment of magnification by the user for the respective task preset. The user has the ability to increase or decrease magnification to a level of subjective comfort or ease. Those skilled in the art understand that visually impaired individuals more often bias to excess magnification. Excess magnification works to their detriment with regard to the width of the content of regard that is visible in the display system. The greater the magnification the less of the content of regard that is visible. In this example, the content of regard is text and the greater the magnification the fewer the number of letters that are visible in the display. The problem solved by the model is to minimize the magnification to optimize the width of the content of regard.

Time use data of the respective user adjustments to the task preset are captured and studied for user's average subjectively adjusted magnification and the trend of magnification subjectively selected by the user. A first computation is made to average the initial magnification setting and the average of the user adjusted magnification settings over a time period to derive an intermediate magnification for a new preset. Other rules may be applied that integrate the time use magnification data with the initial calculated magnification data to derive a modified preset magnification for a task preset.

In one embodiment, the new modified preset is presented each time the power for the eyewear is turned on; thereby the user may be presented with lower magnification than their prior subjective selection. The Neural-loop Computational Model may be repeated over subsequent time intervals to refine the preset and minimize the need for user adjustment while optimizing performance with the display eyewear.

In one embodiment, serial measures of visual acuity are gathered at time intervals. For example, the visual acuity may be measured daily, weekly, monthly or quarterly. The Neural-loop Computational Model may compare a new measure of visual acuity to the initial measure and change a preset respectively by the same algorithm or the user magnification data may be compared to the magnification required for a new measure of visual acuity and averaged to derive a modified preset magnification for a task preset.

In one embodiment, an effort is made to minimize magnification to challenge the known pattern of subjective use of excess magnification. For example, the magnification may be reduced during use by a predetermined percentage and any user adjustment response to greater magnification is monitored by the system. Thresholds of inadequate magnification may be determined by a detected upward adjustment in magnification and a preset may be calculated as the average of the magnification that triggers the subjective upward adjustment and the magnification selected by the user after the adjustment.

Alternate image enhancement features may be computed in a similar manner individually or in combination with image size. In alternate embodiments, display luminance, contrast, or color rendering may be preset individually at levels based on initial inputs. In one embodiment the eyewear may sense the ambient light level and preset the display luminance by use of the measured ambient light. The user may have the ability to increase or decrease the display luminance. Time use data of the respective user adjustments to the task preset are captured and studied for average adjusted display luminance with contemporaneous ambient light measurements. The algorithm for determining display luminance determines the new preset for display luminance as a function of ambient light level. The Neural-loop Computational Model may be repeated over subsequent time intervals to refine the presets and minimize the need for user adjustment while optimizing performance with the display eyewear.

In one embodiment the display luminance may be preset to be different in the better seeing eye than the more visually impaired eye. Those skilled in vision rehabilitation understand that greater vision loss in an eye that was the dominant eye than the eye that was the non-dominant eye may cause the more impaired dominant eye to interfere with the now better vision of the non-dominant eye. One objective is to enhance the images of each eye separately to gain summation rather than interference to allow the user to perform better with both eyes together than with only a single eye. Display luminance differences present one means of assisting summation and reducing interference. Initial clinical testing of eye dominance and visual acuity may be integrated to establish an initial preset for right and left eye display luminance. In one embodiment the user interface of the eyewear may allow the user to modulate the luminance of the right and left eye displays independently and the time use data may capture the trend history of the user selected luminance settings.

In an alternate embodiment, the software application may vary the luminance of at least one display to assess at least one performance response from the user in an effort to determine the luminance setting differences of the right and left eye displays that enhances summation and binocular vision performance. In one example, the display luminance of the better seeing non-dominant eye may be randomly modulated while holding the more impaired dominant eye display luminance constant. The presented differences may be made in 10% greater and lesser luminance increments from a 10% to 100% difference and the user may be asked to respond to the different presentations for ease of reading or greatest clarity. The random presentation of luminance differences may be repeated to test repeatability of the measure.

In one embodiment, the results of the difference in display luminance testing may be used to create a preset. The user may self-modulate the display luminance difference in either the better seeing eye or the more visually impaired eye in an effort to enhance summation and best binocular visual performance away from the preset. Time use data of the respective user adjustments to the preset are captured and studied for average adjusted difference for the purpose of changing the display luminance difference of the preset. The Neural-loop Computational Model may be repeated over subsequent time intervals to refine the presets and minimize the need for user adjustment while optimizing performance with the display eyewear.

In one embodiment the display luminance is determined independently for digital content than for content generated from the camera. In one embodiment image contrast may be adjusted by the user to enhance subjective image quality. Time use data of the respective user adjustments to the task preset are captured and studied for average adjusted contrast for the purpose of changing the contrast value of the preset. The Neural-loop Computational Model may be repeated over subsequent time intervals to refine the presets and minimize the need for user adjustment while optimizing performance with the display eyewear.

In one embodiment, a similar strategy is provided for more normally sighted users who may have mild amblyopia or reduced vision without an organic cause in one eye. In one example, the display luminance of the amblyopic eye may be randomly modulated while holding the luminance constant for the better seeing eye. In an alternate embodiment, the user may self-modulate the display luminance difference in either the better seeing eye or the amblyopic eye in an effort to enhance summation or reduce interference for best binocular visual performance away from the preset. Time use data of the respective user adjustments to the preset are captured and studied for average adjusted difference for the purpose of changing the display luminance difference of the preset. The Neural-loop Computational Model may be repeated over subsequent time intervals to refine at least one preset and minimize the need for user adjustment while optimizing performance with the display eyewear.

In one embodiment a series of color renderings may be presented to the user at the commencement of a task to allow for a selection a preferred color rendering. For example, black on white text may be changed to white on black, blue on yellow, yellow on blue or other color schemes to allow for a subjective selection of a preferred color rendering. Time use data of the respective user adjustments to the task preset are captured and studied for a preferred color rendering and the task preset may be changed to the most preferred color rendering. The Neural-loop Computational Model may be repeated over subsequent time intervals to refine at least one preset and minimize the need for user adjustment while optimizing performance with the display eyewear.

In one embodiment a Rapid Serial Visual Presentation (RSVP) of single words may be used to present text. The RSVP may include presets of magnification, display luminance, contrast, color rendering, and serial presentation speed. An initial measure of reading speed may be conducted using standard clinical tests like MNRead. The preset may be initially set at a percentage slower than the measured MNRead reading speed. Time use data of the respective user adjustments to the task preset of the RSVP speed are captured and studied for average adjusted speed and the task preset may be changed to an average of the initial preset and the average adjusted speed from the time use data. The Neural-loop Computational Model may be repeated over subsequent time intervals to refine at least one preset and minimize the need for user adjustment while optimizing performance with the display eyewear.

In some embodiments the use time of the extended reality eyewear is captured as a total use time per day or a period of days. In other embodiments the use time is captured as a function of time used for each preset or profile. In some embodiments the use time is captured for setting changes or modulation of a setting of a preset. For example, the user may adjust the image size for a reading preset upward from the image size setting provided at the dispensing of the extended reality eyewear. The use time function may then capture the amount of time the eyewear was used at different image size settings for the reading preset.

The use time for changes in each preset or the settings of a profile may be captured to be used to change a preset or to inform an eye care professional or the like of the manner of use of the extended reality eyewear with regard to specific time use of user modulated settings. In some embodiments at least one of the settings for image size, luminance, vertical position, horizontal position, angular orientation, non-uniform zoom, vignetting and reverse vignetting, conversion of text to single word presentation, the speed of the serial single word text visual presentation, or image color may be changed as a result of a change in the time use alone or in conjunction with changes in other measures.

Figure 2:
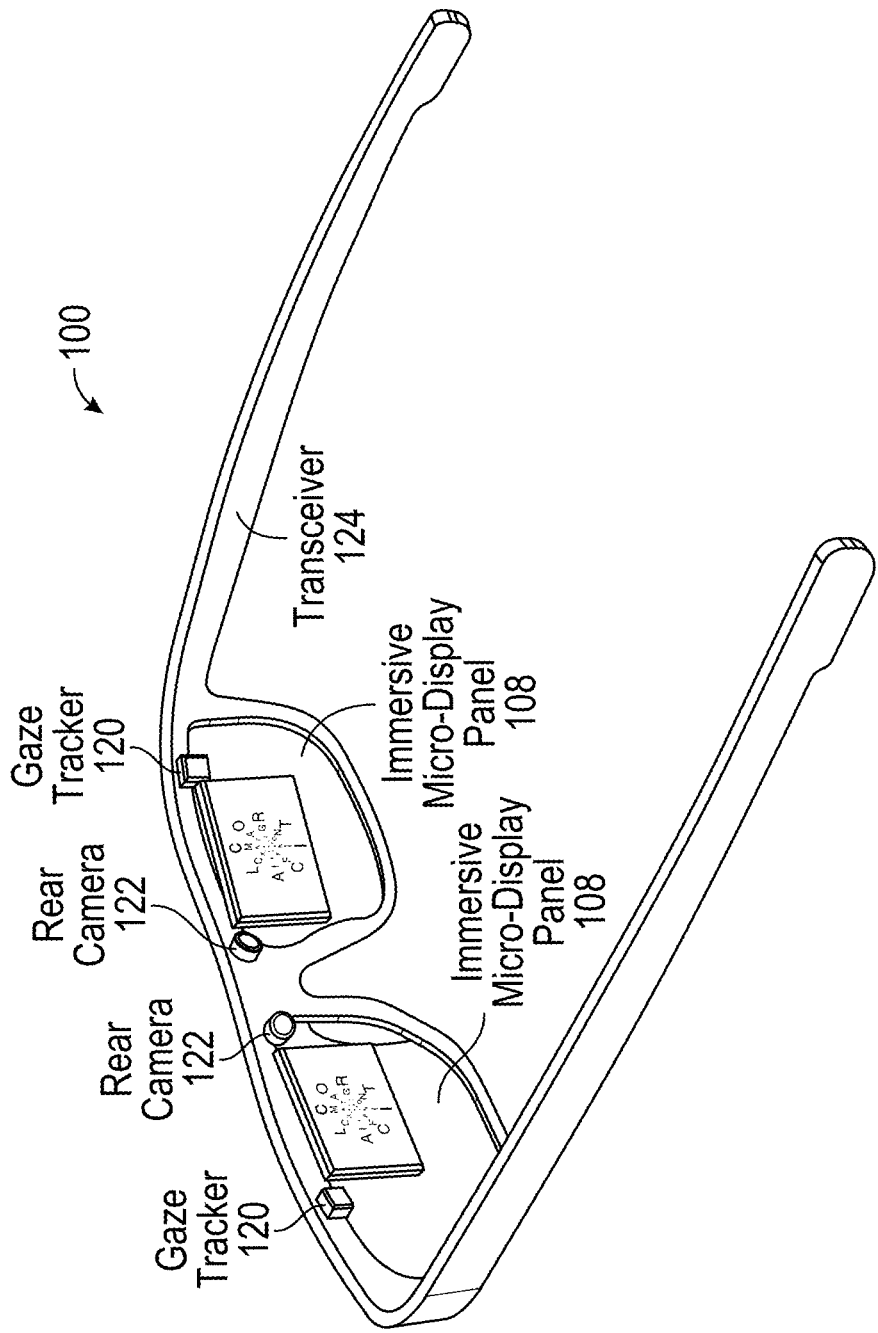

FIGS. 1 and 2 illustrate display eyewear 100 according to some embodiments of the disclosed technology. Referring to FIGS. 1 and 2, the display eyewear 100 may be implemented using a pair of eyeglasses. The eyeglasses may include a front 102, one or more temples 104, and one or more lenses 110. The front 102 may rest upon the bridge of the nose of a user. Each temple 104 may rest upon an ear of the user. But while the described embodiment is implemented using a pair of eyeglasses, it should be understood that such embodiments may be implemented using any apparatus that can be worn on the head or eye of the user. For example, such structures may include headbands, hats, masks, contact lenses and similar apparatus.

The display eyewear 100 may include one or more front cameras 106. In the embodiment of FIG. 1, a camera 106 is mounted on a nose piece of the front 102. However, cameras may be mounted on other portions of the eyewear 100 in addition to, or instead of, this location. The described cameras may be implemented as digital cameras, or the like. However, any sort of camera capable of performing the functions described herein may be used.

The display eyewear 100 may include one or more micro-display panels 108. Each micro-display panel 108 may be implemented as a digital display panel, for example such as an LCD, LCOS, or OLED display panel. However, any sort of display panel capable of performing the functions described herein may be used. The micro-display panels 108 may be transparent or occluded. In some embodiments, the display eyewear 100 may include a user interface that allows the user to transition the micro-display panels 108 between transparent and occluded states. Some embodiments may comprise one or more sensors 114 such as tilt sensors, distance sensors, accelerometers, location sensors and similar sensors.

In some embodiments, the display eyewear 100 may include a controller 112. The controller 112 may be located within one of the temples 104, and/or within some other portion of the display eyewear 100. The controller 112 may receive images captured by the camera 106, and may provide these images to the micro-display panels 108. The controller 112 may process the captured images prior to providing the processed imager to the micro-display panels 108. For example, the controller 112 may magnify, brighten, or otherwise enhance the images. The controller 112 may perform other functions described herein. In some embodiments the controller may be remote from the display eyewear or display contact lens.

In some embodiments, some of the functions described herein may be performed by a processor external to the display eyewear 100. In some embodiments, the display eyewear 100 may include a receiver, transmitter, or both, depicted as transceiver 124. The transceiver 124 may provide communications between the on-board controller 112 and the external processor. The communications may be implemented wirelessly or through a communications cable (not shown).

Figure 3A:
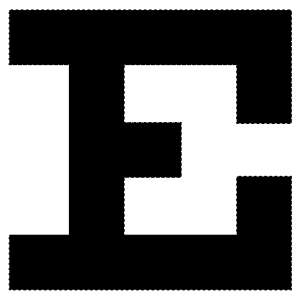
FIG. 3A illustrates a visual acuity chart using optotypes in a Snellen format.
Figure 3A:
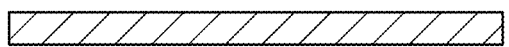
Figure 3A:
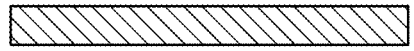

In some embodiments the visual acuity of at least one eye may be measured by presenting a test face on at least one display that has at least one symbol or optotype. The user may respond with a touch controller or by auditory means. The test face may use Snellen or log MAR optotype formats or may use a Landolt C or tumbling E format. FIG. 3A illustrates a visual acuity chart using optotypes in a Snellen format. FIG. 3B illustrates a visual acuity chart using optotypes in a log MAR format.

Figure 3C:
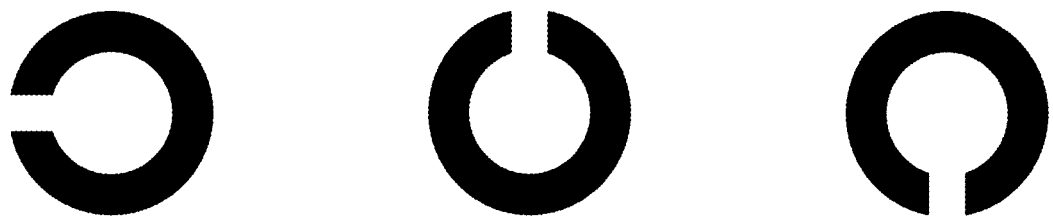
FIG. 3C illustrates a visual acuity chart using optotypes in a Landolt C format.
Figure 3D:
FIG. 3D illustrates a visual acuity chart using optotypes in a tumbling E format.

FIG. 3C illustrates a visual acuity chart using optotypes in a Landolt C format. FIG. 3D illustrates a visual acuity chart using optotypes in a tumbling E format. A single symbol or optotype may be presented that is below the minimum angle of resolution of the eye being tested and the size of the symbol or optotype may be increased until it is first resolved. A line of multiple symbols or optotypes may be presented in the same manner and the measure of the size of first resolution may be recorded.

Figure 4:
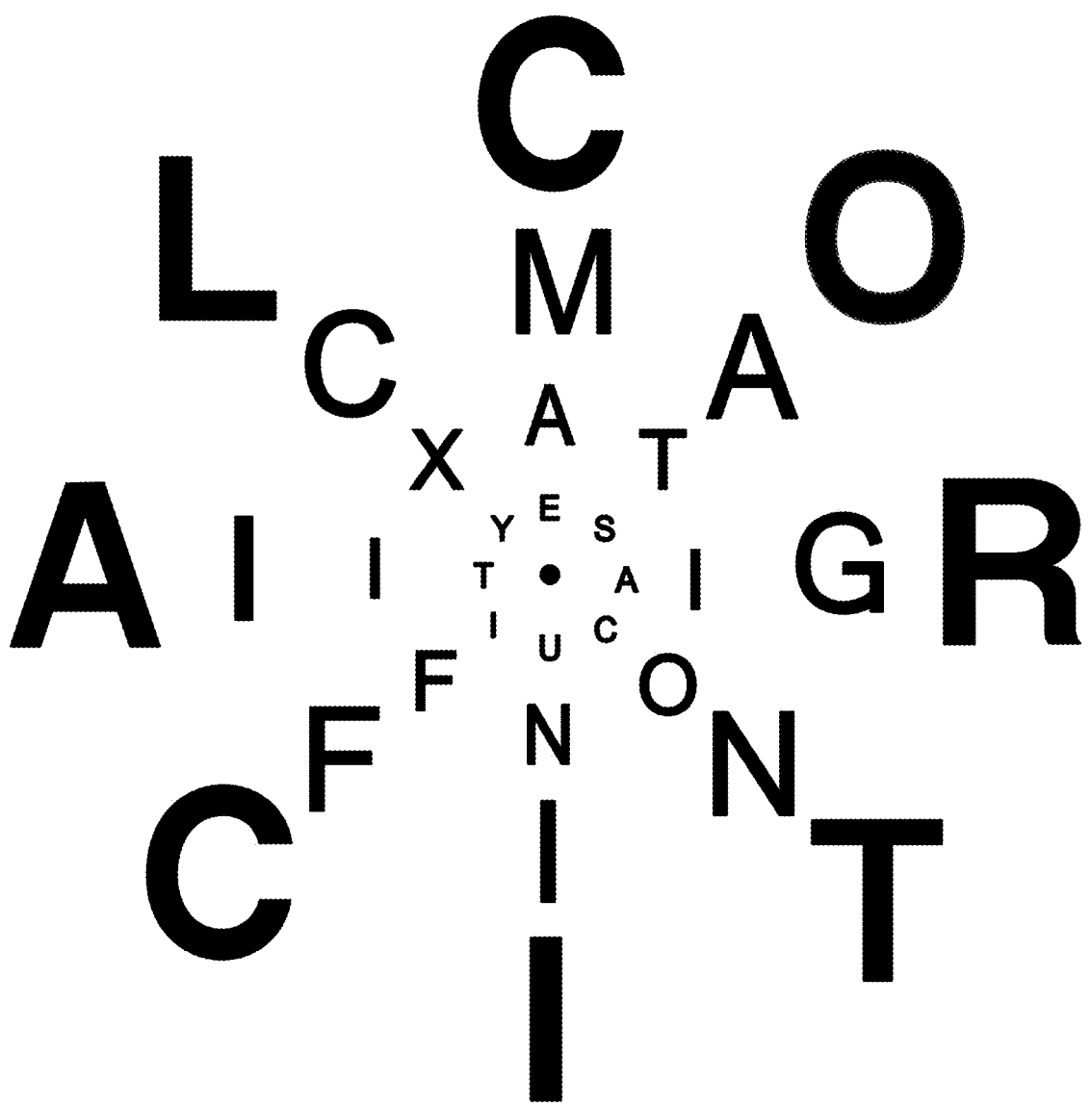
FIG. 4 illustrates a visual acuity chart using optotypes in a Anstis format to allow measurement of peripheral visual acuity with central fixation when central acuity may be lost due to a central visual defect.

FIG. 4 illustrates a visual acuity chart using optotypes in a Anstis format to allow measurement of peripheral visual acuity with central fixation when central acuity may be lost due to a central visual defect.

In some embodiments the visual acuity test face may be presented at low contrast or at high contrast or multiple levels of contrast. The optotypes or symbols may be presented in different color schemes. Reductions in visual acuity are known to indicate risk of changes in eye health, the health of the visual pathway and specifically changes in central retinal function. In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a change in the low or high contrast visual acuity alone or in conjunction with changes in other measures.

In some embodiments a contrast sensitivity test face may be presented using sine wave patterns or spatial frequency targets presented of increasing or decreasing frequency. A single pattern may be presented that is below the spatial frequency for resolving the pattern and the spatial frequency may be increased until first resolved and the measure of the spatial frequency may be recorded. Reductions in contrast sensitivity are known to indicate risk of changes in eye health, the health of the visual pathway and specifically changes in central retinal function. In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a change in the contrast sensitivity alone or in conjunction with changes in other measures.

In some embodiments the user's reading speed may be measured according to standardized testing like MNRead or by other means. The reading speed may be measured for different font sizes or angles subtended by the text at the eye. The reading speed may be measured with different levels of contrast of the text and background or different text and background color schemes. In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a change in the reading speed alone or in conjunction with changes in other measures.

In some embodiments dark adaptation may be measured. Photostress recovery time may be measured by first measuring best visual acuity or the best log MAR, applying photostress and measuring the time until the best visual acuity or the best log MAR acuity is obtained. Alternatively, dark adaptation may be measured objectively using photostress recovery optokinetic nystagmus according to U.S. Pat. Nos. 7,918,558 and 8,382,286 System and Method for Testing Retinal Function may be used by presenting a moving optokinetic nystagmus pattern, determining the smallest spatial frequency with the respective temporal frequency, applying photostress and measuring the time to the restart of optokinetic nystagmus using a gaze tracker.

Figure 5:
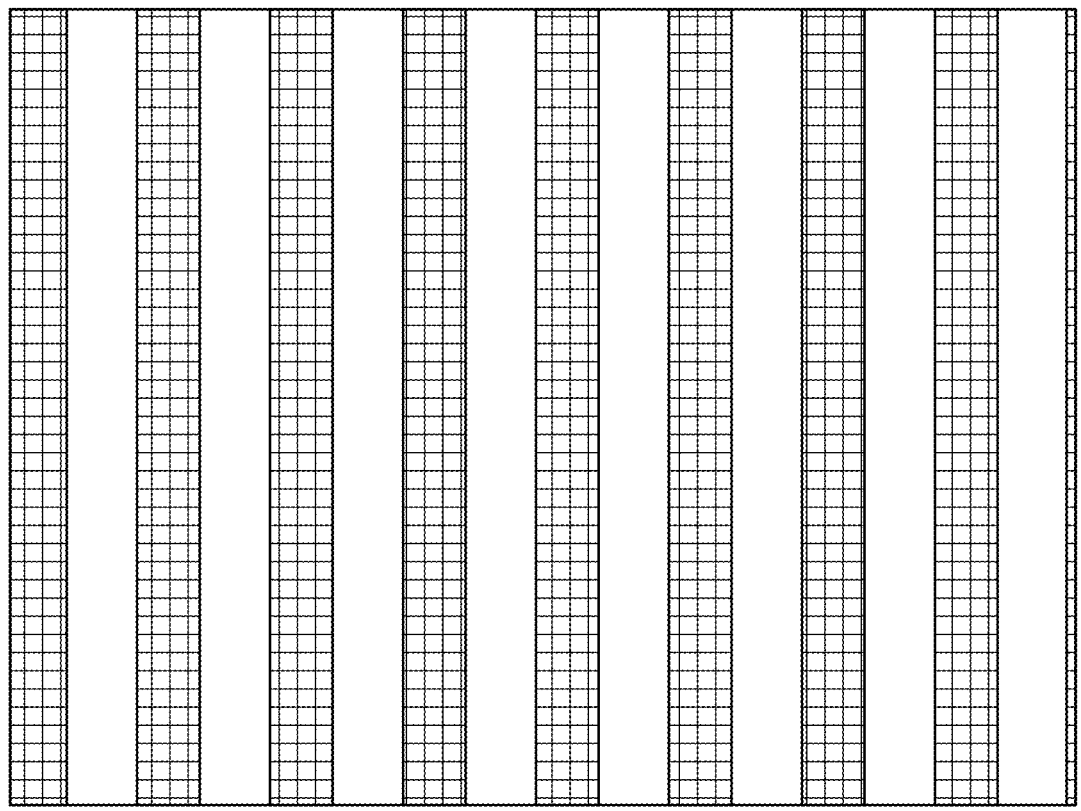
FIG. 5 illustrates an optokinetic nystagmus pattern for objective dark adaptation testing.

FIG. 5 illustrates an optokinetic nystagmus pattern for objective dark adaptation testing. Changes in dark adaptation are known to indicate risk of changes in central retinal function. In some embodiments at least one of the settings for image size, luminance, vertical position, horizontal position, angular orientation, non-uniform zoom, vignetting and reverse vignetting, conversion of text to single word presentation, the speed of the serial visual presentation, or image color may be changed as a result of a change in the dark adaptation alone or in conjunction with changes in other measures.

Figure 6:
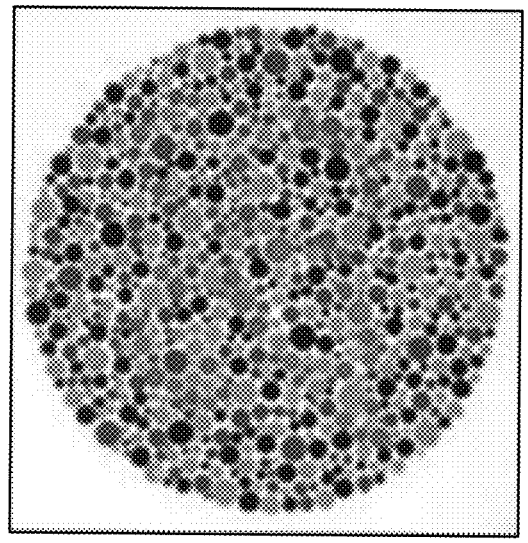
FIG. 6 depicts an example Ishihara pseudoisochromatic plate.
Figure 6:
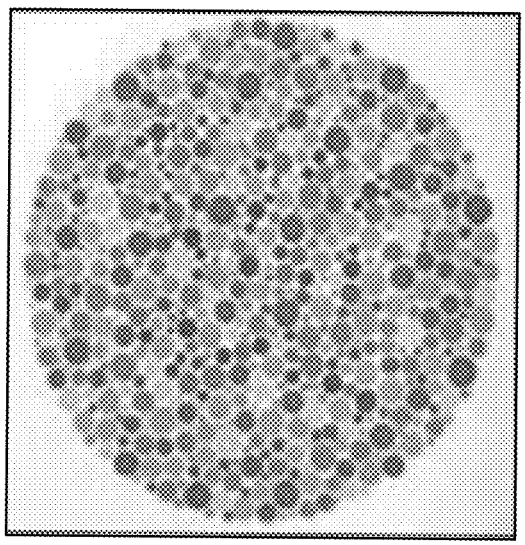
Figure 6:
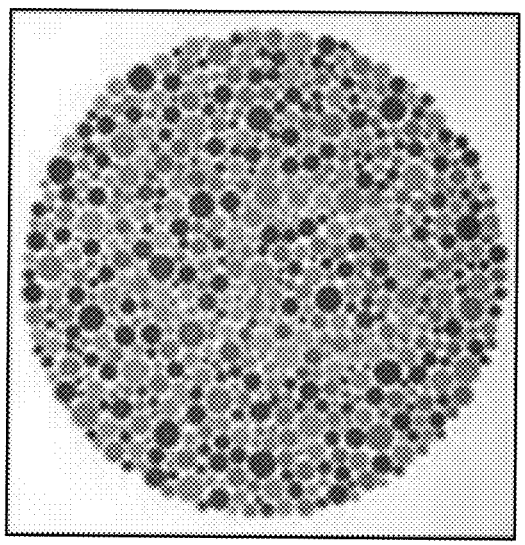

In some embodiments color vision may be tested using pseudoisochromatic plate patterns or other color vision test faces. FIG. 6 depicts an example Ishihara pseudoisochromatic plate. Changes in color vision are known to indicate risk of changes in central retinal function. In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a change in the color vision alone or in conjunction with changes in other measures.

In some embodiments the preferred retinal locus of an eye with a central vision loss may be determined. One method for determining the preferred retinal locus follows the measurement of best monocular visual acuity. At least one optotype of the size of the best visual acuity is presented to a single eye in the center of a display image and radial marks are placed at the periphery of the display that are at least equal in width to the angle subtended by the optotype. The user is asked to look away from the optotype slowly in the direction of each radial mark while being aware of the optotype. The user is then asked if the optotype improves in clarity at any time when looking away from the optotype in the 12 radial directions.

A preferred retinal locus may be discovered for each eye individually when the user is looking away from the optotype in a single direction and a certain distance from the optotype. The steps may be repeated to discover a consistent or repeated response for each eye at the same direction and distance away from the optotype. The size of the optotype may be reduced to determine if the acuity improves from the previous best visual acuity.

In one embodiment the Anstis Chart depicted in FIG. 4 may be used to determine a preferred retinal locus. The user is trained to fixate centrally even if the center letters are not visible and asked to be aware of the peripheral letters. The user is asked to report in which position are the smallest peripheral letters easiest to read. In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a change in the preferred retinal locus alone or in conjunction with changes in other measures.

In some embodiments binocular vision tests may be used to assess at least one of phorias, lateral and vertical fusional reserves, cyclotorsion, and aniseikonia. A phoria is any tendency to deviation of the eyes from the normal when fusional stimuli are absent. A phoria is understood as the natural posturing of the two eyes in the absence of fusion.

High phorias may present a challenge when wearing extended reality eyewear and may result in the loss of fusion or double vision.

Figure 7:
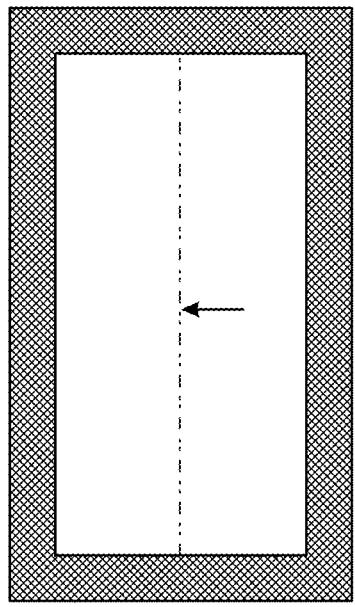
FIG. 7 depicts the right and left eye images for measuring a horizontal phoria wherein the image presented to one eye may be a horizontal bar with numbers placed at degree intervals and an image of an arrow may be presented to the contralateral eye.
Figure 7:
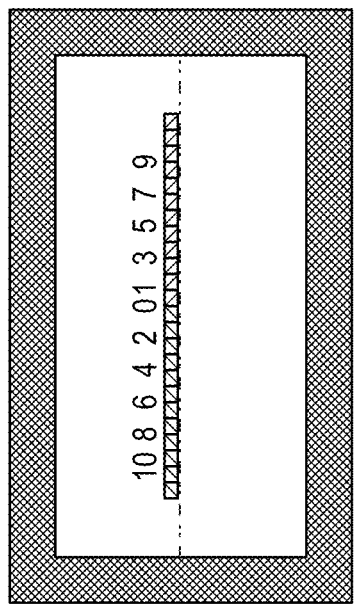

A phoria may be measured with extended reality eyewear by intentionally dissociating the eyes by presenting different images to the two eyes. FIG. 7 depicts the right and left eye images for measuring a horizontal phoria wherein the image presented to one eye may be a horizontal bar with numbers placed at degree intervals and an image of an arrow may be presented to the contralateral eye. The observer may be asked to report the number to which the arrow points. The response may be recorded to determine the lateral phoria in degrees.

In the same manner, a similar image for measuring a vertical phoria may present a vertical bar to one eye with numbers placed at degree intervals and an image of an arrow presented to the contralateral eye. The observer may be asked to report the number to which the arrow points. In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a measurement of a lateral or vertical phoria alone or in conjunction with changes in other measures.

The term fusional reserve refers to a measure of the binocular range of fusion wherein a demand to turn both eyes simultaneously in opposite directions is presented until fusion is broken and diplopia occurs; and then, the measure of the reduction in the demand to turn both eyes in opposite directions until fusion is recovered. The result of the testing of lateral and vertical fusional reserves may be an understanding of the ability of a user's eyes to maintain fusion upon demands for convergence, divergence and vertical misalignment of images presented in the extended reality eyewear. Poor fusion ranges may indicate a higher probability of double vision and eyestrain symptoms when using extended reality eyewear. In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a change in the fusional reserve range alone or in conjunction with changes in other measures.

Cyclotorsion the degree of rotation of an eye around its visual axis or antero-posterior axis. A normal amount of cyclotorsion is about 1.5 degrees. Greater amounts of cyclotorsion may present a problem for a user in maintaining fusion and comfortable use of extended reality eyewear. Cyclotorsion may naturally occur or may be induced by the near eye extended reality eyewear system when one display is rotated for one eye differently than the other display is to the contralateral eye to generate unequal angular position presentations. In each case, the cyclotorsion may cause a loss of fusion and diplopia or may cause an increase in eyestrain symptoms. Test faces for measuring cyclotorsion and cyclotorsion compensation may be employed or the test faces used for phorias may be used in some embodiments of the present invention to measure cyclotorsion. In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a change in the measures of cyclotorsion alone or in conjunction with changes in other measures.

Figure 8:
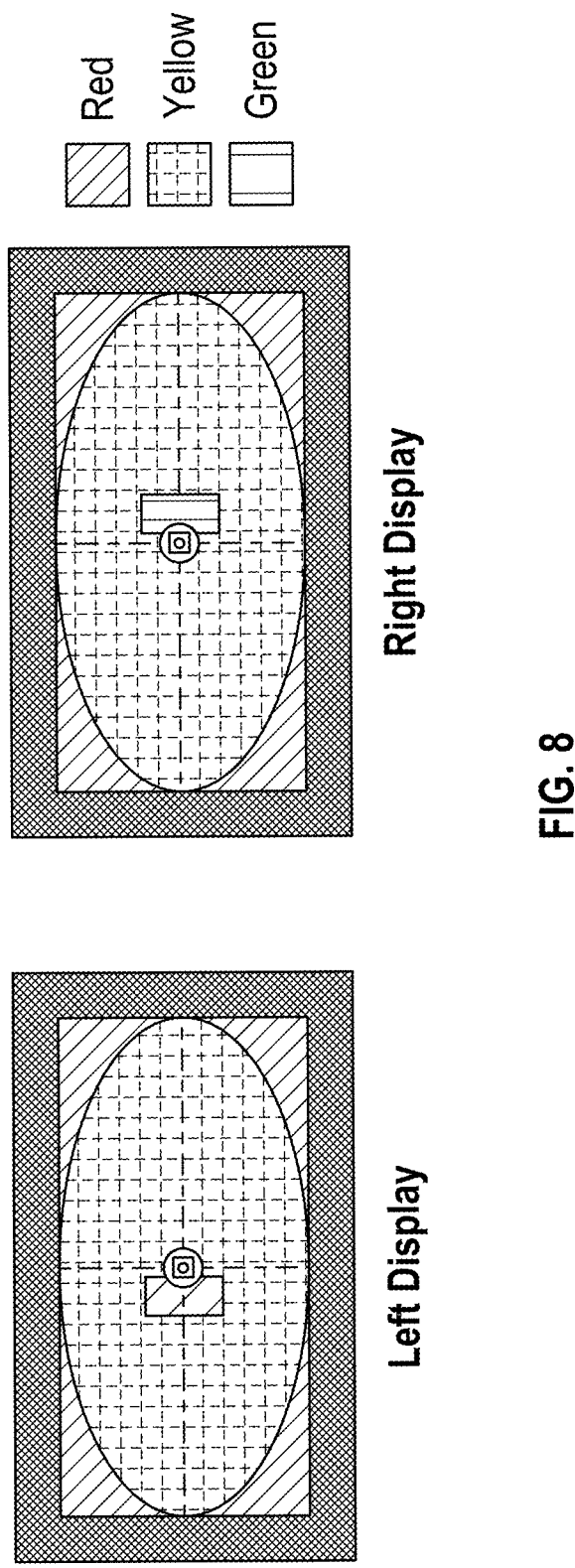
FIG. 8 illustrates the right and left screen images for measuring aniseikonia.

Aniseikonia is a defect of binocular vision in which the two retinal images of an object differ in size. In some embodiments of extended reality eyewear, the image size differences of the right eye and the left eye of a user may be measured. Aniseikonia may naturally occur or may be induced by the near eye extended reality eyewear system when one display is located closer to one eye than the other display is to the contralateral eye or by unequal display image size presentations. In each case, the aniseikonia may cause a loss of fusion and diplopia or may cause an increase in eyestrain symptoms. Test faces for measuring aniseikonia may be employed or the test faces used for phorias may be used in some embodiments of the present invention. For example, the simultaneous and dissociated presentation of identical images to each of the right and left eye for comparison of size and shape may be used to detect aniseikonia. The user may be asked to adjust the image size of one or both of the right and left images to equalize their size. In some embodiments at least one of the settings for image size, luminance, vertical position, horizontal position, angular orientation, non-uniform zoom, vignetting and reverse vignetting, conversion of text to single word presentation, the speed of the serial visual presentation, or image color may be changed as a result of a change in the aniseikonia measure alone or in conjunction with changes in other measures. FIG. 8 illustrates the right and left screen images for measuring aniseikonia.

In some embodiments stereopsis or stereo acuity may be measured. Stereoacuity is the ability to detect differences in distance using stereoscopic cues that are measured by the smallest disparity within images presented to the two eyes that can be detected as a perception of depth. Stereoacuity is measured in seconds of arc to indicate the disparity of the two images with the smallest angular separation. For example, test faces presented to the right and left eyes having a range of seconds of arc disparity may be presented to measure the smallest difference in the images that can be detected reliably.

Figure 9:
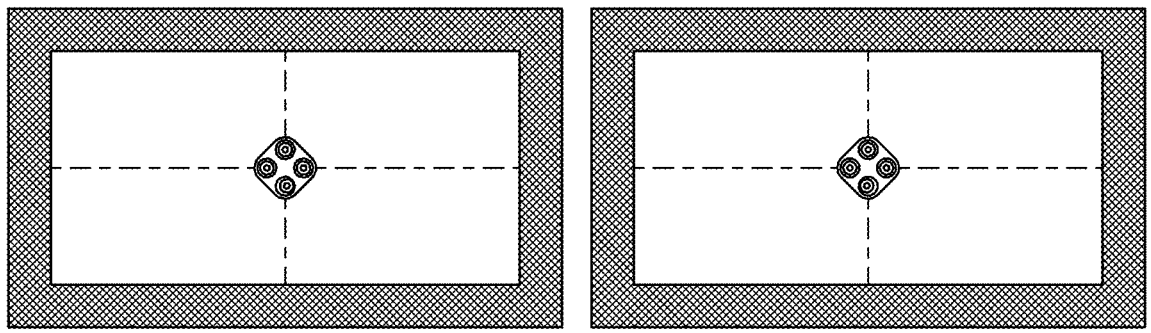
FIG. 9 illustrates one embodiment of right and left screen images for measuring stereopsis.
Figure 9:
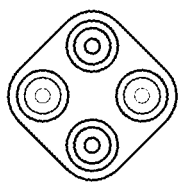
Figure 9:

Test faces for measuring stereopsis including Lang-Stereotest II, the Stereo Smile Stereoacuity II Test, the Randot Preschool Stereoacuity Test or the like may be designed for presentation in the extended reality eyewear to determine the user's stereoacuity in some embodiments of the present invention. FIG. 9 illustrates one embodiment of right and left screen images for measuring stereopsis. Four circles may be presented with three circles having no disparity in right and left images and one circle having a disparity in location when presented to each of the right and left eyes. The subject is asked to report which circle appears to stand out in space compared to the other three. The amount of disparity in the right and left images of one circle is reduced until the subject is unable to determine the correct circle that has the disparity. In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a change in the stereoacuity measure alone or in conjunction with changes in other measures.

In some embodiments visual field testing may be conducted. A central blind spot or scotoma is present in central vision losses. An increase in the size of the central scotoma may indicate progression of the vision loss and may be associated with a further reduction in visual acuity and a change in the preferred retinal locus. A visual field may be conducted by the random presentation of light flashes of a predetermined size in locations throughout the display. The user may be asked to signal the sighting of each light flash by auditory means or by response to a controller. The user must maintain central fixation while the flashes are presented away from the point of fixation. Maintenance of central fixation is difficult for users with a central scotoma because the central fixation target disappears in the central blind spot.

Figure 10:
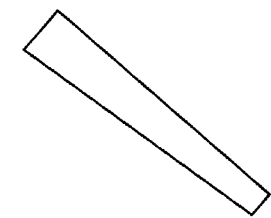
FIG. 10 illustrates a display image for use on an eye with a central scotoma for controlling fixation when measuring visual fields.
Figure 10:
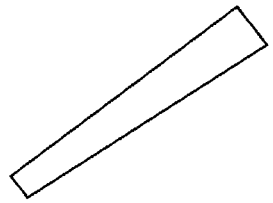
Figure 10:
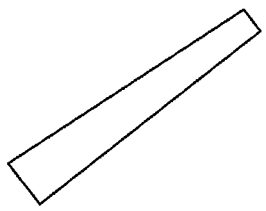
Figure 10:
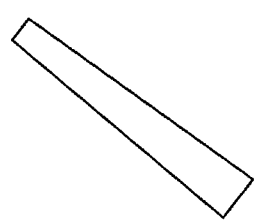

FIG. 10 illustrates a display image for use on an eye with a central scotoma for controlling fixation when measuring visual fields. Visual field testing requires the user to maintain fixation on a central target. Users with a central visual field defect or scotoma may not be able to maintain central fixation. The cross or X pattern of FIG. 10 may be presented and the user may be trained to point the eye at a location where they envision the cross or X to intersect. The random presentation of the visual field targets proceeds until the completion of the test. An inward facing camera or gaze tracker may be used to signal to the user when they shift fixation away from the apparent intersection of the X or cross for the purpose of training the user to maintain central fixation.

In some embodiments at least one of the settings for image size, luminance, vertical position, horizontal position, angular orientation, non-uniform zoom, vignetting and reverse vignetting, conversion of text to single word presentation, the speed of the serial text visual presentation, or image color may be changed as a result of a change in the visual field alone or in conjunction with changes in other measures.

Figures 11, 12:
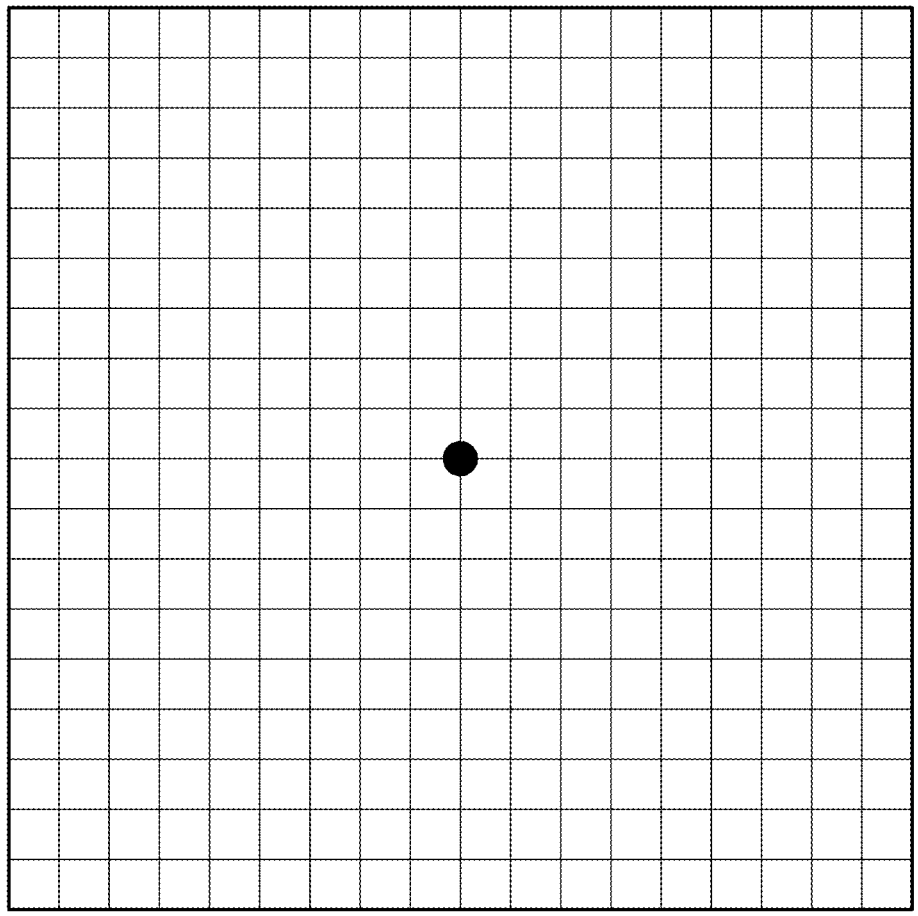
FIG. 11 depicts an Amsler grid that may be presented to a single eye at a time while the user is instructed to fixate on a central fixation target and asked to be aware of the grid without shifting their fixation.
FIG. 12 illustrates the word magnification presented using non-uniform zoom.

In some embodiments a test for detection of a central visual defect or change in a central visual defect may be conducted. The presence of metamorphopsia or a central blind spot or scotoma is present in central vision losses. A change in the metamorphopsia detected by viewing a grid with a central fixation target may indicate progression of the vision loss and may be associated with a further reduction in visual acuity and a change in the preferred retinal locus. FIG. 11 depicts an Amsler grid that may be presented to a single eye at a time while the user is instructed to fixate on a central fixation target and asked to be aware of the grid without shifting their fixation. The user may be asked to detect the appearance of wavy or broken lines or gray areas within the grid. Maintenance of central fixation is difficult for users with a central scotoma because the central fixation target disappears in the central blind spot.

In some embodiments a pattern is presented to allow the user to align their eye with a projected central fixation location. For example, a cross or X shape pattern may be presented on the outer portion of the grid and the user may be asked to look where they anticipate the cross or X shape would have an intersection. The fixation of the user may be assisted in this manner to assist the user in assessing change in their central retinal defect. In some embodiments at least one of the settings for image size, luminance, vertical position, horizontal position, angular orientation, non-uniform zoom, vignetting and reverse vignetting, conversion of text to single word presentation, the speed of serial text visual presentation, or image color may be changed as a result of a change in the central retinal defect assessment alone or in conjunction with changes in other measures.

In some embodiments, a non-uniform zoom may be used to present a single word or object in a manner that conforms with the understanding of peripheral retinal visual acuity as a function of the angular or linear distance that an image falls on the retina from the fovea. A non-uniform zoom may be achieved by progressively enlarging the outer portion of a word or object relative to the central portion of the word or object. FIG. 12 illustrates the word magnification presented using non-uniform zoom. A distortion mask or distortion algorithm may be used to create the non-uniform zoom of the present invention. The degree of distortion or non-uniform zoom may be determined by at least one of measures or changes in measures of visual acuity, contrast sensitivity, color vision, visual field, size of a central scotoma, preferred retinal locus, reading speed, or text size requirement.

In some embodiments one or more cameras may be used to capture images on a blind side of a user who manifests a homonymous hemianopic visual field defect. A portion of the blind side image may be placed at the central high acuity portion of the sighted visual field side while the sighted visual field is digitally stitched to the blind side image within the display content. The user may adjust the angular degree amount of the blind side image to be placed at the center of the sighted half field and the size of the blind side image. For example, the size of the blind side image may be minified to allow for a greater angular portion of the image before stitching the sighted side image. The sighted side image may also be magnified to allow for resolution of the sighted side image when the sighted side image is shifted to the peripheral retinal position to allow for the reduced visual acuity of the peripheral retina on the sighted side.

In some embodiments an inward facing camera may be used to measure pupil size and pupil reactivity. Pupil size may be used alone or integrated with ambient light sensing to adjust at least one of the display luminance setting or a preset for indoor or outdoor use of the extended reality eyewear. Pupil size and reactivity may be used alone or integrated with other psychometric assessments to change presets for messaging intervals, affirmations or supportive messages as therapeutic interventions.

In an alternate embodiment, an inward facing camera or gaze tracker may be used to measure blink rate and/or blink quality. Blink rate and blink quality are known to be associated with dry eye symptoms or dry eye disease wherein infrequent and incomplete blinking exacerbates evaporative dry eye. The blink rate and blink quality may be used alone or integrated with other measured data to change presets for messaging intervals, affirmations or supportive messages as therapeutic interventions.

In an alternate embodiment, an inward facing camera may be used to measure tear break up time, tear meniscus height, conjunctival hyperemia, meibomian gland occlusion, keratinized lid margins, and presence of Demodex mites. Short tear break up time, reduced tear meniscus, increased bulbar conjunctival hyperemia, meibomian gland occlusion and dropout, keratinized lid margins, and presence of Demodex mites are known to be associated with dry eye symptoms or dry eye disease and may be used alone or integrated with other data to change presets for messaging intervals, affirmations or supportive messages as therapeutic interventions.

In some embodiments at least one of pure tone testing or speech threshold testing may be measured using methods common to the field of audiology. The tests may incorporate standard hearing test measures for decibel levels of hearing of at least one frequency as used in pure-tone testing. In some embodiments speech threshold testing may be conducted by the presentation of spoken words through the audio component of the extended reality eyewear system. In some embodiments at least one of the settings for closed caption presentation of image size, luminance, vertical position, horizontal position, angular orientation, non-uniform zoom, vignetting and reverse vignetting, conversion of text to single word presentation, the speed of serial text visual presentation of closed caption recognized speech, image color or audio output may be changed as a result of a change in the auditory measure alone or in conjunction with changes in other measures.

In some embodiments cognitive testing may be employed by images presented and/or the use of sound delivery. At least one of short and or long-term memory, deductive reasoning or daily living skill capability may be assessed using microphone or camera captured activity. For example, the Montreal Cognitive Assessment test may be presented to the user with the extended reality eyewear to test memorizing a short list of words, identifying a picture of an animal, and copying a drawing of a shape or object. Alternatively, the Mini-Mental State Exam may be presented to test the naming of the current date, counting backward, and identifying everyday objects like a pencil or watch. Or, the Mini-Cog or the like may be used to test Mild Cognitive Impairment. It is known that combined visual impairment and auditory impairment increases the risk of cognitive impairment. Changes in cognitive impairment may be used in conjunction with other measures to change the settings or presets of the extended reality eyewear according to the present invention. In some embodiment the presets may include time sequencing and content of visual and auditory messaging, reminders, cognitive stimulation activities or cognitive behavioral therapy.

In some embodiments at least one of depression, mania, anxiety or other psychological state endpoints may be captured by conjoint interaction with the user and the eyewear. Audio delivered speech and visual display images may be presented for user response. Pupil size and pupil reactivity may be measured. Pupil size and pupil reactivity are known to change with emotional state and with use of psychotropic medications and with use of controlled substances. For example, opiates are known to cause the pupils of the user to be constricted and non-reactive while stimulants like cocaine and methamphetamine are known to cause the pupils of the user to be dilated and lower in reactivity. Hippus or a bouncing of the pupil is known to be associated with altered levels of consciousness and use of intoxicants.

Psychological assessments with or without pupil size and reactivity measures according to the present invention may be used to change at least one setting or a preset of the extended reality eyewear. In some embodiment the presets may include time sequencing and content of visual and auditory messaging, reminders, therapeutic interventions or behavioral therapy.

In one embodiment, the use of at least one of pupil size and reactivity or didactic or conjoint interaction with the user may detect the possibility of at least one of a change in affect, a failure to take a medication, a use of a controlled substance or intoxicant or the departure from a therapeutic step. The detected possibility may be used to change at least one setting or preset of the extended reality eyewear.

In one embodiment, the display luminance setting may be increased when the psychological assessment of the present invention determines the presence of seasonal affective disorder. It is understood that photobiomodulation by use of light to stimulate the intrinsically photosensitive ganglion cells for the purpose of regulating serotonin and the resultant affective state may remedy seasonal affective disorder.

In some embodiments the application software of the extended reality eyewear may have settings to provide psychotropic pharmaceutical prescription use reminders based on pupil size and reactivity or addiction treatment messages or affirmations. In some embodiments the application software of the extended reality eyewear may have settings to provide entertainment or cognitive stimulation activity in an automatic manner with measured changes in mild cognitive impairment.

In some embodiments, one or more cameras or sensors may detect the cues or triggers for migraine headache or seizures as in Epilepsy by capture of patterns preceding reported headache onset or monitored seizures. The triggers or minimal cues may be auditory, visual or environmental events. Machine learning may be applied to discover and detect the triggers or minimal cues and may provide an alert to the user and information to their health care professional. At least one of the settings for image size, display luminance, vertical position, horizontal position, vertical and lateral fusion demands, angular orientation, non-uniform zoom, vignetting and reverse vignetting, conversion of text to single word presentation, the speed of serial text visual presentation, image color, message content, message intervals or other presets may be changed as a result of the measured triggers, cues, or responses or in conjunction with changes in other measures.

In some embodiments, the application may be directed to therapeutic intervention for binocular vision problems, visual perceptual disabilities, traumatic brain injuries, cognitive deficits and the like wherein methods known by those skilled in the art are delivered with visual content delivered by electronic displays. Inward facing cameras, gaze trackers and auditory systems for capturing voice responses and the like may be used to capture performance during therapy sessions. At least one of the settings for image size, display luminance, vertical position, horizontal position, vertical and lateral fusion demands, angular orientation, non-uniform zoom, vignetting and reverse vignetting, conversion of text to single word presentation, the speed of serial text visual presentation, image color, or other presets may be changed as a result of the measured responses during the therapy alone or in conjunction with changes in other measures.

In some embodiments, the software may include the use of Interpreting or characterizing the type of content based on a mathematical convolution of the frames of the video stream. Images may be described by certain characteristics of content types, for example text, portraits, landscapes, architecture, vehicles, facial expressions. The human visual system is adept at perceiving differences in characteristics of content types and making categorizations. Computers may be trained to learn the signatures using algorithms or artificial intelligence training. The images may then be presented in alternate forms that are easier for the computer to interpret.

There are mathematical transformations available for signal and image processing that may convert images into numerical data-types instead of spatial presentation. The transforms may be used to convert the image data into frequency and phase data, and the inverse-transform may be used to transform the frequency and phase data into the image by way of an image transformation.

A known image transformation is the 2D Fourier Transform which applies the transform in both horizontal and vertical directions to create two 2-dimensional matrices of frequency magnitudes and phase components. The Fourier Transform may be a 2D Fourier Transform and may be a series expansion of an image function over the 2-dimensional space domain in terms of "cosine" image (orthonormal) basis functions.

The definitions of the transform to expansion coefficients and the inverse transform may be as given below:

$$F(u,v)=\text{SUM}\{f(x,y)*\exp(-j*2*pi*(u*x+v*y)/N)\} \quad \text{(Transform)}$$

and $$f(x,y)=\text{SUM}\{F(u,v)*\exp(+j*2*pi*(u*x+v*y)/N)\} \text{ (Inverse Transform)}$$

where u=0, 1, 2, . . . , N−1 and v=0, 1, 2, . . . , N−1
x=0, 1, 2, . . . , N−1 and y=0, 1, 2, . . . , N−1
j=SQRT(−1)
and SUM means double summation over proper x,y or u,v ranges.

The image in spatial domain may be transformed into the frequency domain and phase domain after which additional algorithms may be applied in these domains to manipulate and adjust the image. Image sharpening and blurring may be accomplished using this method because once the data has been transformed into the frequency domain it may be adjusted to the frequency data to increase or decrease the image sharpness and then transform the data back into the spatial domain for interpretation by the user. The uniqueness of the graphical representations for transformed letters and other various images may be considered the "fingerprint" of the image as it is unique to that specific image. Images with similar features will have similar fingerprints, and may be used to instruct the system to execute a command.

In some embodiments, camera images or other image input may be dominated by text, the signatures will fall into a specific type of fingerprint that may be detectable. Within the class of text-image fingerprints, the size of the text will further segregate the images into sub-groups. The Artificial Intelligence system or computer algorithm may learn that a user will generally adjust zoom for text until a comfortable reading size is achieved. As such, the system may detect when text is being attended to and automatically adjust the zoom level to deliver the text size required for comfortable viewing regardless of the original text size.

This enhancement is a preferred method of manipulating the Zoom control instead of using pre-defined zoom levels based on a user selectable mode of operation, or a head tilt-controlled mode of operation, because the software learns from the user's own adjustments what is most preferred.

Figure 13:
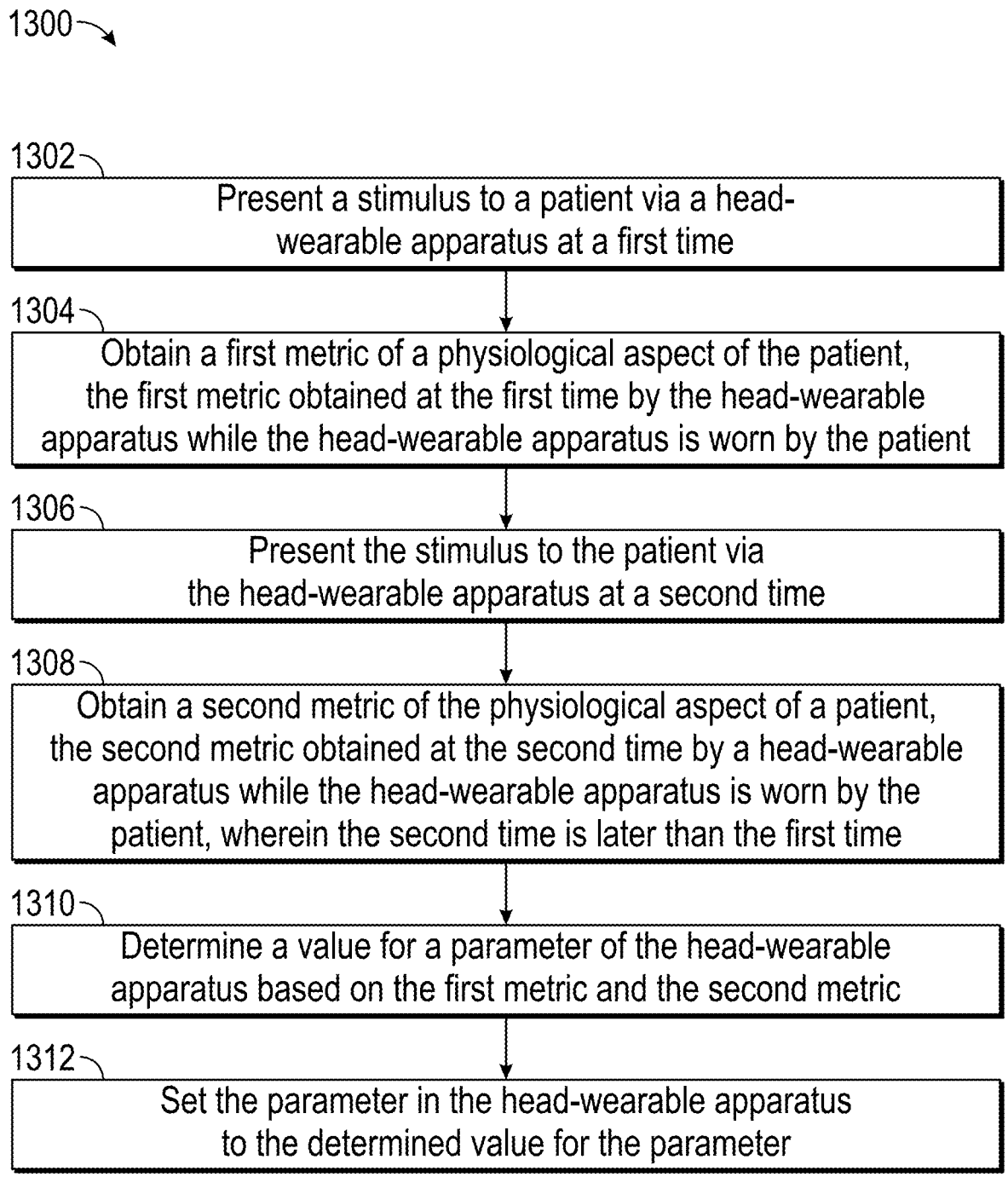
FIG. 13 is a flowchart illustrating a process for intelligent extended reality eyewear according to some embodiments of the disclosed technologies.

FIG. 13 is a flowchart illustrating a process 1300 for intelligent extended reality eyewear according to some embodiments of the disclosed technologies. The process 1300 may be employed, for example, in the display eyewear 100 of FIGS. 1 and 2.

The elements of the process 1300 are presented in one arrangement. However, it should be understood that one or more elements of the process may be performed in a different order, in parallel, omitted entirely, and the like. Furthermore, the process 1300 may include other elements in addition to those presented. For example, the process 1300 may include error-handling functions if exceptions occur, and the like.

Referring again to FIG. 13, the process 1300 may include presenting a stimulus to a patient via a head-wearable apparatus at a first time, at 1302.

Referring again to FIG. 13, the process 1300 may include obtaining a first metric of a physiological aspect of the patient, the first metric obtained at the first time by the head-wearable apparatus while the head-wearable apparatus is worn by the patient, at 1304.

Referring again to FIG. 13, the process 1300 may include presenting the stimulus to the patient via the head-wearable apparatus at a second time, at 1306.

Referring again to FIG. 13, the process 1300 may include obtaining a second metric of the physiological aspect of a patient, the second metric obtained at the second time by a head-wearable apparatus while the head-wearable apparatus is worn by the patient, wherein the second time is later than the first time, at 1308.

Referring again to FIG. 13, the process 1300 may include determining a value for a parameter of the head-wearable apparatus based on the first metric and the second metric, at 1310.

Referring again to FIG. 13, the process 1300 may include setting the parameter in the head-wearable apparatus to the determined value for the parameter, at 1312.

Figure 14:
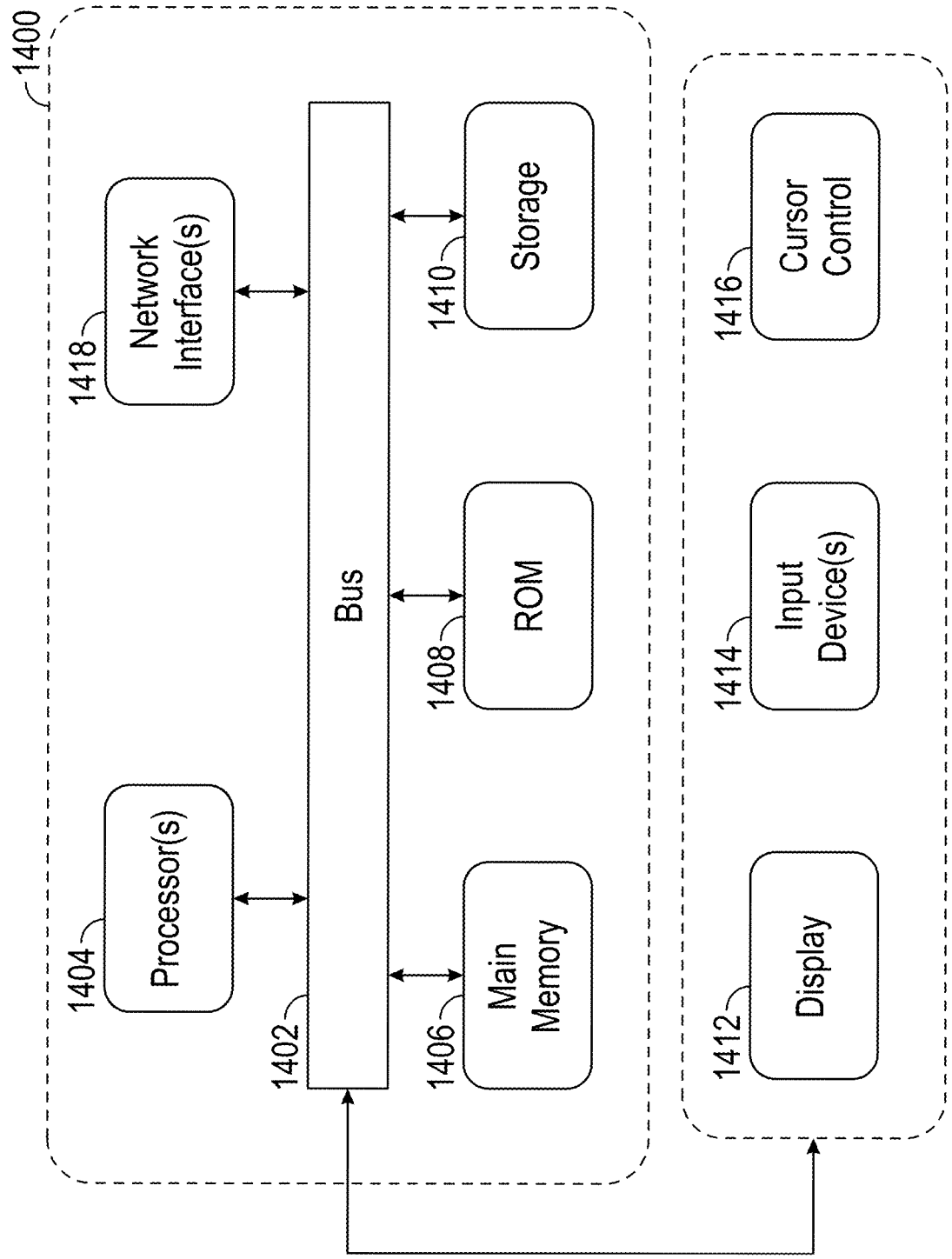
FIG. 14 depicts a block diagram of an example computer system in which embodiments described herein may be implemented.

FIG. 14 depicts a block diagram of an example computer system 1400 in which embodiments described herein may be implemented. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to a display 1412, such as a liquid crystal display (LCD) (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. In some embodiments, the same direction information and command selections as cursor control may be implemented via receiving touches on a touch screen without a cursor.

The computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

The computer system 1400 also includes a communication interface 1418 coupled to bus 1402. Network interface 1418 provides a two-way data communication coupling to one or more network links that are connected to one or more local networks. For example, communication interface 1418 may be an integrated services digital network (ISDN) card, cable modem, satellite modem, or a modem to provide a data communication connection to a corresponding type of telephone line. As another example, network interface 1418 may be a local area network (LAN) card to provide a data communication connection to a compatible LAN (or a WAN component to communicate with a WAN). Wireless links may also be implemented. In any such implementation, network interface 1418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1418, which carry the digital data to and from computer system 1600, are example forms of transmission media.

The computer system 1400 can send messages and receive data, including program code, through the network (s), network link and communication interface 1418. In the Internet example, a server might transmit a requested code for an application program through the Internet, the ISP, the local network and the communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
   obtaining a first metric of a physiological aspect of a patient, the first metric obtained at a first time by a head-wearable apparatus while the head-wearable apparatus is worn by the patient;
   obtaining a second metric of the physiological aspect of a patient, the second metric obtained at a second time by the head-wearable apparatus while the head-wearable apparatus is worn by the patient, wherein the second metric is different than the first metric, wherein the second time is later than the first time;
   determining a value for a parameter of the head-wearable apparatus based on the first metric and the second metric; and
   setting the parameter in the head-wearable apparatus to the determined value for the parameter;
   wherein the first and second metrics are selected from the group consisting of: preferred retinal locus, lateral and vertical fusional reserves, cyclotorsion, aniseikonia, stereopsis, and central retinal visual defect detection.

2. The computer-implemented method of claim 1, further comprising:
   presenting a stimulus to the patient via the head-wearable apparatus at the first time; and
   presenting the stimulus to the patient via the head-wearable apparatus at the second time.

3. The computer-implemented method of claim 1, wherein determining the value for the parameter of the head-wearable apparatus based on the first metric and the second metric comprises:
   providing the first metric and the second metric as input to a machine learning model, the machine learning model being trained according to historical metrics and corresponding values for the parameter, wherein responsive to the input, the machine learning model provides as output the value for the parameter of the head-wearable apparatus.

4. The computer-implemented method of claim 1, further comprising:
   determining a time value based on the first time and the second time; and
   determining the value for the parameter of the head-wearable apparatus based on the first metric, the second metric, and the determined time value.

5. The computer-implemented method of claim 1, wherein the physiological aspect of a patient comprises one or more of:
   an aspect related to the vision of the patient, or
   an aspect related to the hearing of the patient.

6. The computer-implemented method of claim 1, further comprising:
   determining a change in a condition of the patient based on the first metric and the second metric; and
   determining the value for the parameter of the head-wearable apparatus based on the determined change in the condition of the patient.

7. The computer-implemented method of claim 6, wherein the condition of the patient comprises one or more of:
   a visual condition of the patient;
   an auditory condition of the patient;
   a cognitive condition of the patient; or
   a psychological condition of the patient.

8. A system, comprising:
   one or more hardware processors; and
   a non-transitory machine-readable storage medium encoded with instructions executable by the one or more hardware processors to perform operations comprising:
   obtaining a first metric of a physiological aspect of a patient, the first metric obtained at a first time by a head-wearable apparatus while the head-wearable apparatus is worn by the patient;
   obtaining a second metric of the physiological aspect of a patient, the second metric obtained at a second time by the head-wearable apparatus while the head-wearable apparatus is worn by the patient, wherein the second metric is different than the first metric, wherein the second time is later than the first time;
   determining a value for a parameter of the head-wearable apparatus based on the first metric and the second metric; and
   setting the parameter in the head-wearable apparatus to the determined value for the parameter;
   wherein the first and second metrics are selected from the group consisting of: preferred retinal locus, lateral and vertical fusional reserves, cyclotorsion, aniseikonia, stereopsis, and central retinal visual defect detection.

9. The system of claim 8, the operations further comprising:
   presenting a stimulus to the patient via the head-wearable apparatus at the first time; and presenting the stimulus to the patient via the head-wearable apparatus at the second time.

10. The system of claim 8, wherein determining the value for the parameter of the head-wearable apparatus based on the first metric and the second metric comprises:
providing the first metric and the second metric as input to a machine learning model, the machine learning model being trained according to historical metrics and corresponding values for the parameter, wherein responsive to the input, the machine learning model provides as output the value for the parameter of the head-wearable apparatus.

11. The system of claim 8, the operations further comprising:
determining a time value based on the first time and the second time; and
determining the value for the parameter of the head-wearable apparatus based on the first metric, the second metric, and the determined time value.

12. The system of claim 8, wherein the physiological aspect of a patient comprises one or more of:
an aspect related to the vision of the patient, or
an aspect related to the hearing of the patient.

13. The system of claim 8, the operations further comprising:
determining a change in a condition of the patient based on the first metric and the second metric; and
determining the value for the parameter of the head-wearable apparatus based on the determined change in the condition of the patient.

14. The system of claim 13, wherein the condition of the patient comprises one or more of:
a visual condition of the patient;
an auditory condition of the patient;
a cognitive condition of the patient; or
a psychological condition of the patient.

15. A non-transitory machine-readable storage medium encoded with instructions executable by a hardware processor of a computing component, the machine-readable storage medium comprising instructions to cause the hardware processor to perform operations comprising:
obtaining a first metric of a physiological aspect of a patient, the first metric obtained at a first time by a head-wearable apparatus while the head-wearable apparatus is worn by the patient;
obtaining a second metric of the physiological aspect of a patient, the second metric obtained at a second time by the head-wearable apparatus while the head-wearable apparatus is worn by the patient, wherein the second metric is different than the first metric, wherein the second time is later than the first time;
determining a value for a parameter of the head-wearable apparatus based on the first metric and the second metric; and setting the parameter in the head-wearable apparatus to the determined value for the parameter;
wherein the first and second metrics are selected from the group consisting of: preferred retinal locus, lateral and vertical fusional reserves, cyclotorsion, aniseikonia, stereopsis, and central retinal visual defect detection.

16. The non-transitory machine-readable storage medium of claim 15, the operations further comprising:
presenting a stimulus to the patient via the head-wearable apparatus at the first time; and
presenting the stimulus to the patient via the head-wearable apparatus at the second time.

17. The non-transitory machine-readable storage medium of claim 15, wherein determining the value for the parameter of the head-wearable apparatus based on the first metric and the second metric comprises:
providing the first metric and the second metric as input to a machine learning model, the machine learning model being trained according to historical metrics and corresponding values for the parameter, wherein responsive to the input, the machine learning model provides as output the value for the parameter of the head-wearable apparatus.

18. The non-transitory machine-readable storage medium of claim 15, the operations further comprising:
determining a time value based on the first time and the second time; and
determining the value for the parameter of the head-wearable apparatus based on the first metric, the second metric, and the determined time value.

19. The non-transitory machine-readable storage medium of claim 15,
wherein the physiological aspect of a patient comprises one or more of:
an aspect related to the vision of the patient, or an aspect related to the hearing of the patient.

20. The non-transitory machine-readable storage medium of claim 15, the operations further comprising:
determining a change in a condition of the patient based on the first metric and the second metric; and
determining the value for the parameter of the head-wearable apparatus based on the determined change in the condition of the patient.

21. The non-transitory machine-readable storage medium of claim 20,
wherein the condition of the patient comprises one or more of:
a visual condition of the patient;
an auditory condition of the patient;
a cognitive condition of the patient; or
a psychological condition of the patient.

* * * * *